(12) United States Patent
Armstrong et al.

(10) Patent No.: US 9,752,049 B2
(45) Date of Patent: Sep. 5, 2017

(54) OPTICALLY TRANSPARENT, SUPERHYDROPHOBIC, BIOCOMPATIBLE THIN FILM COATINGS AND METHODS FOR PRODUCING SAME

(71) Applicant: UT-BATTELLE, LLC, Oak Ridge, TN (US)

(72) Inventors: Beth L. Armstrong, Clinton, TN (US); Tolga Aytug, Knoxville, TN (US); Mariappan Parans Paranthaman, Knoxville, TN (US); John T. Simpson, Clinton, TN (US); Daniel A. Hillesheim, Knoxville, TN (US); Neil E. Trammell, Benton, KY (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 14/185,830

(22) Filed: Feb. 20, 2014

(65) Prior Publication Data

US 2015/0232690 A1    Aug. 20, 2015

(51) Int. Cl.
*B05D 1/02* (2006.01)
*C09D 163/00* (2006.01)
*C09D 4/06* (2006.01)
*B05D 1/00* (2006.01)
*C08F 222/32* (2006.01)

(52) U.S. Cl.
CPC ............. *C09D 163/00* (2013.01); *C09D 4/06* (2013.01); *B05D 1/005* (2013.01); *B05D 1/02* (2013.01); *C08F 2222/322* (2013.01)

(58) Field of Classification Search
CPC . B05D 1/005; B05D 1/02; C09D 4/06; C09D 163/00; C08F 2222/322
USPC .......................... 427/240, 425, 421.1, 427.4
See application file for complete search history.

(56) References Cited

U.S. PATENT DOCUMENTS

| | | |
|---|---|---|
| 5,958,601 A | 9/1999 | Salsman |
| 6,069,770 A | 5/2000 | Cui et al. |
| 6,191,202 B1 | 2/2001 | Greff et al. |
| 6,342,268 B1 | 1/2002 | Samain et al. |
| 6,532,326 B1 | 3/2003 | Hutchinson et al. |
| 6,552,842 B2 | 4/2003 | Simpson et al. |
| 6,569,527 B1 | 5/2003 | Calhoun et al. |
| 6,661,952 B2 | 12/2003 | Simpson et al. |
| 6,757,463 B2 | 6/2004 | Hutchinson et al. |
| 6,853,669 B2 | 2/2005 | Simpson et al. |
| 7,150,904 B2 | 12/2006 | D'Urso et al. |
| 7,220,430 B2 | 5/2007 | Ishibashi et al. |
| 7,258,731 B2 | 8/2007 | D'Urso et al. |
| 7,312,875 B2 | 12/2007 | Hanson et al. |
| 7,344,783 B2 | 3/2008 | Shea |
| 7,638,182 B2 | 12/2009 | D'Urso et al. |
| 7,697,807 B2 | 4/2010 | D'Urso et al. |
| 7,697,808 B2 | 4/2010 | D'Urso et al. |
| 7,754,279 B2 | 7/2010 | Simpson et al. |
| 8,101,913 B2 | 1/2012 | Ivanov et al. |
| 8,142,516 B2 | 3/2012 | Simpson et al. |
| 8,152,916 B2 | 4/2012 | Meyer et al. |
| 8,193,406 B2 | 6/2012 | Simpson et al. |
| 8,202,749 B1 | 6/2012 | Ivanov et al. |
| 8,208,136 B2 | 6/2012 | Ivanov et al. |
| 8,216,674 B2 | 7/2012 | Simpson et al. |
| 8,497,021 B2 | 7/2013 | Simpson et al. |
| 2005/0038205 A1 | 2/2005 | Wenning et al. |
| 2006/0167178 A1* | 7/2006 | Kitamura ............. C08F 220/64 524/833 |
| 2007/0269658 A1 | 11/2007 | Kondos et al. |
| 2008/0286556 A1 | 11/2008 | D'Urso et al. |
| 2009/0105262 A1* | 4/2009 | Whiteford ..................... 514/248 |
| 2009/0238854 A1 | 9/2009 | Pacetti et al. |
| 2010/0012880 A1 | 1/2010 | Rampersaud et al. |

FOREIGN PATENT DOCUMENTS

CN    101838116    9/2010

OTHER PUBLICATIONS

Valignat et al., "Structure and dynamics of thin liquid films on solid substrates", Colloids and Surfaces A: Physiochemical and Engineering Aspects (1999) 154: 25-31.

Wang et al., "Fabrication of superhydrophobic surfaces o engineering material surfaces with stearic acid", Applied Surface Science (2008) 254(7): 2009-2012.

Xie et al., "A novel simple approach to preparation of superhydrophobic surfaces of aluminum alloys", Applied Surface Science (2011) 258(3): 1004-1007.

* cited by examiner

*Primary Examiner* — Kirsten Jolley
(74) *Attorney, Agent, or Firm* — Fox Rothschild LLP

(57) ABSTRACT

An optically transparent, hydrophobic coating, exhibiting an average contact angle of at least 100 degrees with a drop of water. The coating can be produced using low-cost, environmentally friendly components. Methods of preparing and using the optically transparent, hydrophobic coating.

24 Claims, 3 Drawing Sheets ized thin film coatings and methods for producing same

STATEMENT REGARDING FEDERALLY SPONSORED RESEARCH

This invention was made with government support under contract No. DE-AC05-00OR22725 awarded by the U.S. Department of Energy. The government has certain rights in this invention.

BACKGROUND OF THE INVENTION

1. Field of the Invention

The invention relates generally to transparent, superhydrophobic thin film coatings.

2. Description of the Related Art

There are many practical applications for superhydrophobic thin film coatings. They can be used on car windshields, sky-scraper windows, and binocular lenses to both improve visibility and protect from water corrosion. They can also be used to weatherproof solar panels and overhead power lines. In the past, such coatings have been tested on either metallic substrates or glass surfaces that have been roughened at the nano-scale. These tests have generally resulted in what are considered superhydrophobic surfaces. The criteria for a hydrophobic or superhydrophobic surface are based on contact angle. This is the angle that the contour of a water droplet makes with the flat substrate. A hydrophobic surface must have a contact angle of 90° or greater, while a superhydrophobic surface must have a contact angle of at least 150°.

The hydrophobicity of solutions containing polydimethylsiloxane (PDMS), such as the car-care product RAIN-X® is known. PDMS, once cross-linked and polymerized, forms a hydrophobic surface with an average contact angle of 110°.

Coating a silicate material via reactive-silane technology has also been used to produce hydrophobic surfaces. Typically, chlorosilane derivatives of long-chain fatty acids, either as the parent hydrocarbon or as a perfloro or polyfluoro derivative, are reacted with surface hydroxyl groups to produce a covalent bond between the hydrophobizing agent and the surface. In the case of the chloro-based derivatives, hydrochloric acid, a toxic, corrosive gas, is produced. Another limitation of this technology includes the high expense of the reactive-silanes.

A need remains, however, to use low-cost, environmentally friendly materials to develop an optically transparent, hydrophobic coating with properties comparable to existing hypdrophobic solutions, such as RAIN-X®. Water droplets on RAIN-X® coated glass will bead up rather than spread out over the glass, increasing visibility during rainfall.

Information relevant to attempts to address these problems can be found in the related art. However, the related art suffers from one or more disadvantages, which are not admitted to have been known in the art by inclusion in this section.

Fatty acids are both inexpensive and have a long, hydrophobic carbon chain ending with a hydrophilic carboxylic acid. In theory, the carboxylic acid will bond to the hydroxyl groups in borosilicate glass, leaving the water repellant carbon chains standing on end. Previous studies used an aluminum alloy surface etched with $HNO_3$ as the substrate, then coated with stearic acid/ethanol solution to lower the surface energy. See Wang et al. "Fabrication of Superhydrophobic Surfaces on Engineering Material Surfaces with Stearic acid." *Applied Surface Science* 254 (2008) 2009-2012.

Others have used a similar etching technique, but finished by coating with a lower molecular weight fatty acid such as lauric acid dissolved in ethanol. See: Degang Xie, Wen Li. "A novel simple approach to preparation of superhydrophobic surfaces of aluminum alloys." Applied Surface Science 258 (2011): 1004-1007. The etching process roughens the substrate, causing air pockets to form, which when coated with a fatty acid, results in a superhydrophobic surface.

None of the information included in this section is admitted to be prior art with respect to the present invention by inclusion in this section.

BRIEF SUMMARY OF THE INVENTION

The present invention is directed to compositions and methods that solve the above-identified needs. Various embodiments relate to an optically transparent, hydrophobic coating, exhibiting an average contact angle of 110 degrees with a drop of water. The coating can be produced using low-cost, environmentally friendly components.

The coating compositions according to various embodiments can be useful in a variety of commercial applications, including but not limited to: coatings; paints; anti-bio fouling coatings and materials; corrosion resistant coatings and materials; bio-medical devices, coatings, and materials. The compositions can also be employed as replacements for polydimethylsiloxane (PDMS)-based hydrophobic coatings, such as RAIN-X®, including but not limited to coatings for windows, windshields, Military equipment; road treatments, building technology coatings; textiles and textile coatings; anti-acing materials and coatings; and anti-fogging coatings and materials.

BRIEF DESCRIPTION OF THE DRAWINGS

These and other features, aspects, and advantages of the present invention will become better understood with reference to the following description and appended claims, and accompanying drawings where:

Figure 1A:
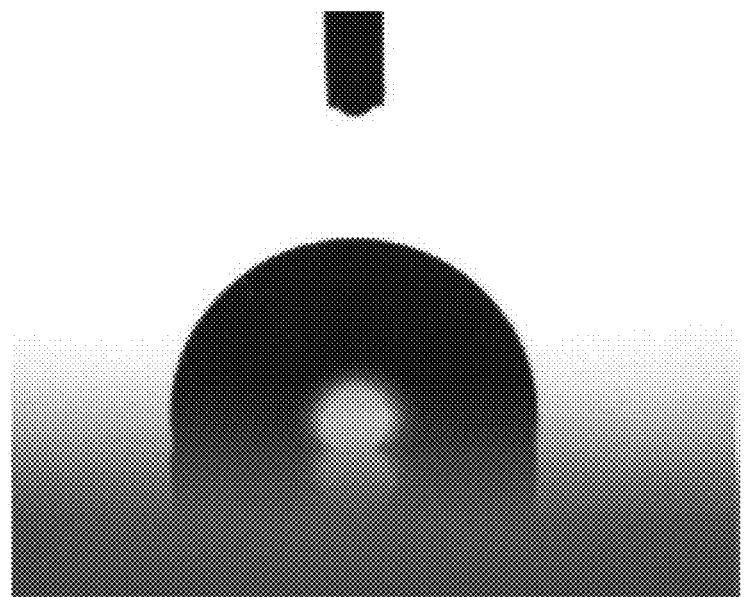
FIG. 1a: is a photograph of one embodiment exhibiting an average contact angle of 99.2 degrees.

It should be understood that the various embodiments are not limited to the arrangements and instrumentality shown in the drawings.

DETAILED DESCRIPTION OF THE INVENTION

The present invention may be understood more readily by reference to the following detailed description of preferred embodiments of the invention as well as to the examples included therein. In the following detailed description and in the claims which follow, reference will be made to a number of terms which shall be defined to have the following meanings:

A "hydrophobic" surface is a surface that exhibits a contact angle within a range having a lower limit and/or an upper limit. The range can include or exclude the lower limit and/or the upper limit. The lower limit and/or upper limit can be selected from 90, 90.5, 91, 91.5, 92, 92.5, 93, 93.5, 94, 94.5, 95, 95.5, 96, 96.5, 97, 97.5, 98, 98.5, 99, 99.5, 100, 100.5, 101, 101.5, 102, 102.5, 103, 103.5, 104, 104.5, 105, 105.5, 106, 106.5, 107, 107.5, 108, 108.5, 109, 109.5, 110, 110.5, 111, 111.5, 112, 112.5, 113, 113.5, 114, 114.5, 115, 115.5, 116, 116.5, 117, 117.5, 118, 118.5, 119, 119.5, 120, 120.5, 121, 121.5, 122, 122.5, 123, 123.5, 124, 124.5, 125, 125.5, 126, 126.5, 127, 127.5, 128, 128.5, 129, 129.5, 130, 130.5, 131, 131.5, 132, 132.5, 133, 133.5, 134, 134.5, 135, 135.5, 136, 136.5, 137, 137.5, 138, 138.5, 139, 139.5, 140, 140.5, 141, 141.5, 142, 142.5, 143, 143.5, 144, 144.5, 145, 145.5, 146, 146.5, 147, 147.5, 148, 148.5, 149, and 149.5 degrees. For example, according to certain preferred embodiments, a "hydrophobic" surface is a surface that exhibits a contact angle of 90 degrees or greater with a drop of water.

A "superhydrophobic" surface is a surface that exhibits a contact angle within a range having a lower limit and/or an upper limit. The range can include or exclude the lower limit and/or the upper limit. The lower limit and/or upper limit can be selected from 150, 150.5, 151, 151.5, 152, 152.5, 153, 153.5, 154, 154.5, 155, 155.5, 156, 156.5, 157, 157.5, 158, 158.5, 159, 159.5, 160, 160.5, 161, 161.5, 162, 162.5, 163, 163.5, 164, 164.5, 165, 165.5, 166, 166.5, 167, 167.5, 168, 168.5, 169, 169.5, 170, 170.5, 171, 171.5, 172, 172.5, 173, 173.5, 174, 174.5, 175, 175.5, 176, 176.5, 177, 177.5, 178, 178.5, 179, 179.5, and 180 degrees. For example, according to certain preferred embodiments, a "superhydrophobic" surface is a surface that exhibits a contact angle of 150 degrees or greater with a drop of water.

As used herein, "optically transparent" refers to a material or layer that transmits rays of visible light in such a way that the human eye may see through the glass distinctly. One definition of optically transparent is a maximum of 50% attenuation at a wavelength of 550 nm (green light) for a material or layer, e.g., a layer 1 μm thick. Another definition can be based on the Strehl Ratio, which ranges from 0 to 1, with 1 being a perfectly transparent material. Exemplary optically transparent materials can have a Strehl Ratio ≥0.5, or a Strehl Ratio ≥0.6, or a Strehl Ratio ≥0.7, or a Strehl Ratio ≥0.8, or a Strehl Ratio ≥0.9, or a Strehl Ratio ≥0.95, or a Strehl Ratio ≥0.975, or a Strehl Ratio ≥0.99.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to an optically transparent, hydrophobic coating, exhibiting an average contact angle of 110 degrees with a drop of water. The coating can be produced using low-cost, environmentally friendly components. Since inexpensive components were used, this new coating will accomplish the same task as other hydrophobic coatings for a fraction of the cost. The coating composition can include a solvent, a fatty acid, an epoxy resin, and a cyanoacrylate. The epoxy resin and the cyanoacrylate can be incorporated in order to bind the fatty acids to a glass platform.

The solvent can be present in an amount within a range having a lower limit and/or an upper limit. The range can include or exclude the lower limit and/or the upper limit. The lower limit and/or upper limit can be selected from 95, 95.05, 95.1, 95.15, 95.2, 95.25, 95.3, 95.35, 95.4, 95.45, 95.5, 95.55, 95.6, 95.65, 95.7, 95.75, 95.8, 95.85, 95.9, 95.95, 96, 96.05, 96.1, 96.15, 96.2, 96.25, 96.3, 96.35, 96.4, 96.45, 96.5, 96.55, 96.6, 96.65, 96.7, 96.75, 96.8, 96.85, 96.9, 96.95, 97, 97.05, 97.1, 97.15, 97.2, 97.25, 97.3, 97.35, 97.4, 97.45, 97.5, 97.55, 97.6, 97.65, 97.7, 97.75, 97.8, 97.85, 97.9, 97.95, 98, 98.05, 98.1, 98.15, 98.2, 98.25, 98.3, 98.35, 98.4, 98.45, 98.5, 98.55, 98.6, 98.65, 98.7, 98.75, 98.8, 98.85, 98.9, 98.95, 99, 99.05, 99.1, 99.15, 99.2, 99.25, 99.3, 99.35, 99.4, 99.45, 99.5, 99.55, 99.6, 99.65, 99.7, 99.75, 99.8, 99.85, 99.9, and 99.95 percent. For example, according to certain preferred embodiments, the solvent can be present in an amount of from 98.5 to 99.3 percent by weight.

The fatty acids can be present in an amount within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, and 2 percent. For example, according to certain preferred embodiments, the fatty acids can be present in an amount of from 0.1 to 1 percent by weight. According to certain preferred embodiments, the fatty acids can be present in an amount of about 0.6 percent by weight.

The epoxy resin including hardener can be present in an amount within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, and 2 percent. For example, according to certain preferred embodiments, the epoxy resin including hardener can be present in an amount of from 0.1 to 0.9 percent by weight. According to certain preferred embodiments, the epoxy resin can be present in an amount of about 0.2 percent by weight.

The cyanoacrylate can be present in an amount within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, and 2 percent. For example, according to certain preferred embodiments, the cyanoacrylate can be present in an amount of from 0.1 to 0.9 percent by weight. According to certain preferred embodiments, the cyanoacrylate can be present in an amount of about 0.2 percent by weight.

The solvent can be selected from the group consisting of ethanol, isopropanol, hexane, acetone, toluene and combinations thereof. According to various preferred embodiments, the solvent can be ethanol.

Formula II is an example of a cyanoacrylate used according to various embodiments,

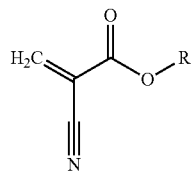

I where R can be any hydrocarbon, including a $C_1$-$C_{100}$ hydrocarbon. The hydrocarbon can optionally contain one or more functional groups. A preferable cyanoacrylate is given by Formula I, where R is an ethyl group. Other examples include n-propyl-cyanoacrylate, iso-propyl cyanoacrylate, n-butylcyanoacrylate, sec-butyl-cyanoacrylate, iso-butyl-cyanoacrylate, tert-butyl-cyanoacrylate, n-pentyl-cyanaocrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphthyl I-cyanoacrylate, 2-(2'-methoxy)-ethoxy ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2'-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butylcyanoacrylate, 2-(2'-ethoxy)-butyloxy butyl-cyanoacrylate, 2-(2'-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-propyloxy propyl-cyanoacrylate, 2-(3'-methoxy)-butyloxy propyl-cyanoacrylate, 2-(2'-methoxy)-ethoxy propyl-cyanoacrylate, and 2-(2'-methoxy)-ethoxy, butyl-cyanoacrylate, and combinations thereof. It has been unexpectedly discovered that such fatty acids can be used to replace PDMS as the source of chemically hydrophobic low surface energy alternates to induce hydrophobicity.

Formula II is an example of a fatty acid used according to various embodiments,

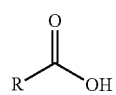

II where R can be any hydrocarbon, including a $C_1$-$C100$ hydrocarbon. Preferably, R is $(CH_2)_{20}CH_3$.

Other fatty acids can be employed including but not limited to Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid, Arachidic acid, Heneicosylic acid, Behenic acid, Tricosylic acid, Lignoceric acid, Pentacosylic acid, Cerotic acid, Heptacosylic acid, Montanic acid, Nonacosylic acid, Melissic acid, Henatriacontylic acid, Lacceroic acid, Psyllic acid, Geddic acid, Ceroplastic acid, Hexatriacontylic acid, and combinations thereof. The fatty acid can be saturated or unsaturated.

Suitable epoxy resins include but are not limited to bisphenol A epoxy resins; bisphenol F epoxy resins; novolac epoxy resins; aliphatic epoxy resins including glycidyl epoxy resins and cycloaliphatic epoxides; glycidylamine epoxy resins, and combinations thereof.

Coating methods include but are not limited to spin coating, spraying, and combinations thereof.

The coating composition can provide a hydrophobic coating on a glass surface, exhibiting a contact angle. The improvement over uncoated glass surface can be staggering (15° versus)110°).

The coating composition according to various embodiments can be used to coat a nanoporous substrate, having a plurality of nanostructures to create a superhydrophobic surface.

The nanoporous structure can include a substrate and a nanostructured layer attached to the substrate. The nanostructured layer can include a plurality of spaced apart nanostructured features comprising a contiguous, protrusive material and the nanostructured features can be sufficiently small that the nanostructured layer is optically transparent. The nanostructured layer can include a plurality of nanopores defined by the contiguous, protrusive material, e.g., the nanostructured features.

The nanostructures features formed from a contiguous, protrusive material described herein can be formed by differentially etching of spinodally decomposed materials as described in U.S. Pat. No. 7,258,731, "Composite, Nanostructured, Super-Hydrophobic Material", issued to D'Urso et al., on Aug. 21, 2007; U.S. Patent Application Publication No. 2008/0286556, "Super-Hydrophobic Water Repellant Powder," published Nov. 20, 2008; and U.S. patent application Ser. No. 12/901,072, "Superoleophilic Particles and Coatings and Methods of Making the Same," (hereinafter "Differential Etching References") filed Oct. 8, 2010, the entireties of which are incorporated by reference herein.

As used herein, nanostructured feature has its literal meaning and includes, but is not limited to, nanoscale protrusions and nanoscale branched networks. As used herein, "nanoscale branched network" refers to a branched network where the individual branches are less than 1 µm. In some examples, the branches of the nanoscale branched networks described herein can be 750 nm or less in length, or 600 nm or less in length, or 500 nm or less in length. A branch can be defined by the space (i) between adjacent junctions 22, (ii) between a junction 22 and a terminal end 24 of the network, i.e., a nanoscale protrusion, or (iii) both. The length of a branch can be measured as the distance (i) between adjacent junctions 22, (ii) between a junction 22 and a terminal end 24 of the network, i.e., a nanoscale protrusion, or (iii) both. Though not a nanoscale branched network, staghorn coral (A. cervicornis) would be considered an exemplary branched network.

The width, length and height of each of the plurality of spaced apart nanostructured features can independently range from 1 to 500 nm, or from 2 to 400, or from 3 to 300 nm, or from 4 to 250 nm, or from 5 to 200 nm, or any combination of these ranges, e.g., 1 to 200 nm. The width, length and height of each of the plurality of spaced apart nanostructures features can be at least 5 nm, at least 7 nm, at least 10 nm, or at least 20 nm.

As used herein, the term "nanopores" refers to pores with a major diameter ranging from 1 to 750 nm. Nanopores can also refer to pores having a major diameter ranging from 5 to 500 nm, or 10 to 400 nm, or any combination thereof, e.g., 400 to 750 nm. The nanostructured layer described herein can have a nanopore size ranging from 10 nm to about 10 µm, or 100 nm to 8 µm, or 500 nm to 6 µm, or 1 to 5 µm, or any combination thereof, e.g., 500 nm to 5 µm.

The invention is further described in the following illustrative examples in which all parts and percentages are by weight unless otherwise indicated.

EXAMPLES

In the following examples reference (untreated) borosilicate microscope slides were used as the substrate, to mimic the surface of a window or car windshield. The solvents used to dissolve the fatty acids in this study were chosen based on availability and ability to evaporate quickly once the coating had been applied to the glass slide. They were all organic in nature, most of them non-polar to prevent any reaction with the fatty acid. The concentration of fatty acid in solvent is also crucial to the process. Solubility is a major factor in the choice of both fatty acid and solvent. A higher molecular weight acid would most likely be more hydrophobic, but it might have such a low solubility limit that it would be wiser to sacrifice quality for quantity and choose a slightly less hydrophobic acid with a higher solubility. If there is no combination of fatty acid and solvent that results in a contact angle of at least 90°, there is the possibility of adding certain chemical agents to act as a binder between the glass slide and the fatty acid. There were many processing parameters/steps involved in this procedure, and each one had to be adjusted to achieve a desirable result.

Example 1

The first step was to gather solubility data on the fatty acids in readily available solvents. Originally, there were four fatty acids to work with: Lauric Acid ($C_{12}H_{24}O_2$), Myristic Acid ($C_{14}H_{28}O_2$), Palmitic Acid ($C_{16}H_{32}O_2$), and Stearic Acid ($C_{18}H_{36}O_2$). The available solvents included ethanol, isopropanol, hexane, and acetone. Below table shows the solubility limits of each fatty acid in the five organic solvents:

TABLE 1

| | Solubility Limit (mol/L) | | | |
| --- | --- | --- | --- | --- |
| | Lauric Acid | Myristic Acid | Palmitic Acid | Stearic Acid |
| Ethanol | 0.3 | 0.3 | 0.1 | 0.1 |
| Isopropanol | 0.2 | — | — | 0.05 |
| Hexane | 0.2 | — | — | 0.02 |
| Acetone | 0.1 | — | — | — |

The dashed lines indicate that either the fatty acid was insoluble in that solvent, and/or did not provide an advantage over others to the project. It was discovered that ethanol was the best solvent for any of these four fatty acids, because it easily dissolved most of the fatty acids. The next step was to use spin-coating to apply the optimum mixture of each fatty acid/alcohol solution to microscope slides. This process began with cleaning the slide, then affixing it to the spin-coater by turning on the internal vacuum. Once the slide was in place, the chosen solution was applied by a syringe using a 0.02 micron filter. This filter was to ensure that only the pure solution and no contaminants or occasional precipitates made it onto the slide. The coated slide was then spun at 1000 rpm for thirty seconds and placed on a hot plate at 152 degrees Fahrenheit to vaporize any remaining solvent. The slide was allowed to cool for two minutes. Once cool, the slide was subjected to a simple yet effective test of hydrophobicity. This test consisted of merely placing a water droplet on the slide using a Pasteur pipet and eyeballing it to see if it even merited further characterization. This process was repeated for many slides, each time varying the type of fatty acid and the solvent as well as the concentration of the fatty acid in the solvent. Testing each of these slides with a water droplet revealed a trend of increasing hydrophobicity corresponding to increasing length of fatty acid carbon chain. Sample NT-5, a 0.1 M Stearic Acid/Ethanol solution, was by far the most hydrophobic compared to any of the spin-coated solutions. This trend led to the purchase of Behenic Acid ($C_{22}H_{44}O_2$). If the trend was correct, Behenic Acid should have even better hydrophobic properties than Stearic Acid. Solubility experiments on Behenic Acid showed a much lower solubility limit than any of the previous four fatty acids. This resulted in the introduction of Toluene as a possible solvent. Below is additional solubility data for Behenic Acid:

TABLE 2

| Solubility Limit (mol/L) | |
|---|---|
| | Lauric Acid |
| Ethanol | 0.01 |
| Isopropanol | 0.01 |
| Hexane | — |
| Acetone | — |
| Toluene | 0.02 |

Toluene proved to be an excellent solvent for Behenic Acid, but the results from spin-coating were still not as good as they were expected to be. Since none of the fatty acids at any concentration appeared to have a contact angle of 90 degrees or greater. In order to provide a low concentration of an epoxy resin was added to the Behenic Acid and toluene to chemically bind the fatty acid to the glass, with the hope of increasing hydrophobicity. The epoxy came in two separate tubes, one containing the gray epoxy resin, the other containing the white hardener. In order to avoid an unwanted reaction until the solution was applied to the glass, the white hardener was dissolved in the toluene with the Behenic Acid before the addition of the gray epoxy resin. Two solutions were tested with the same amount of epoxy, one with 0.01 M Behenic Acid, and the other with 0.02 M Behenic Acid. Even at the very low concentration of 0.02 g in 10 mL of solution, the epoxy turned the clear solutions into a cloudy gray color. When spin-coating these solutions, the 0.02 micron filter was used again to ensure no larger particles made it onto the slide. The result from such a cloudy solution was surprising. These were the first two spin-coated slides that showed real promise. They were both virtually transparent, and appeared to have contact angles of 90° or higher when tested with a water droplet from a Pasteur pipet. At this point, commercially available ethyl cyanoacrylate (Krazy Glue) was introduced as alternative chemical binder. Since ethyl cyanoacrylate is a clear one part liquid, it was easier to incorporate into the 0.01 M and 0.02 M Behenic Acid/Toluene solutions. At the same concentration as the epoxy binder, the glue had a very similar effect, producing a clear, hydrophobic coating.

Figure 1B:
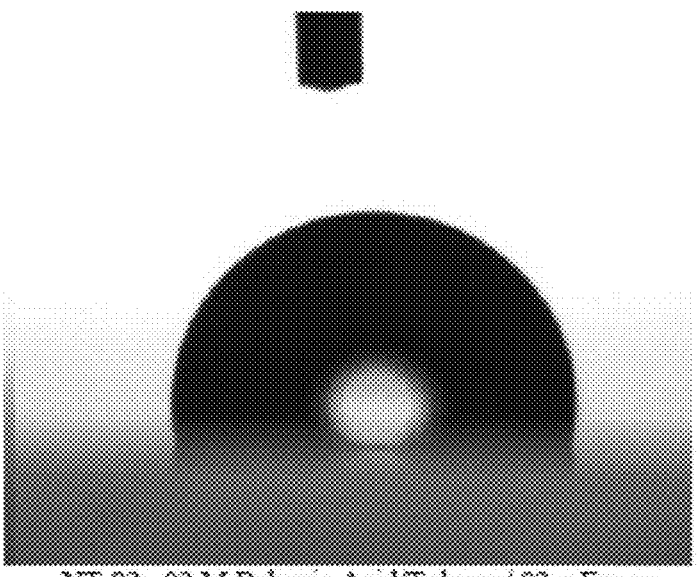
FIG. 1b: is a photograph of one embodiment exhibiting an average contact angle of 102.8 degrees.

These slides were characterized using water droplet contact angle measurements to find the average contact angle of several 4 μL droplets of water placed at random on their surfaces. Sample NT-79 had an average contact angle of 99.2 degrees, and NT-82 had an average contact angle of 102.8 degrees as seen in FIG. 1.

Figure 2A:
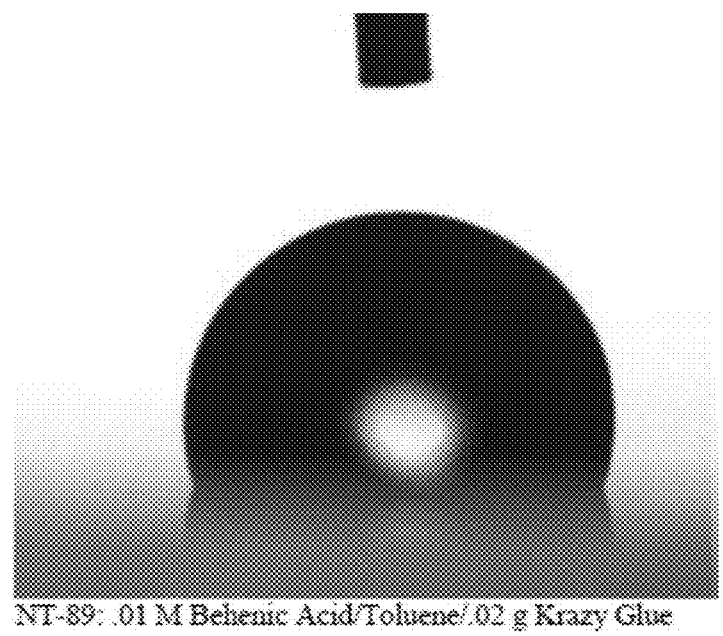
FIG. 2a: is a photograph of one embodiment exhibiting an average contact angle of 108.1 degrees.
Figure 2B:
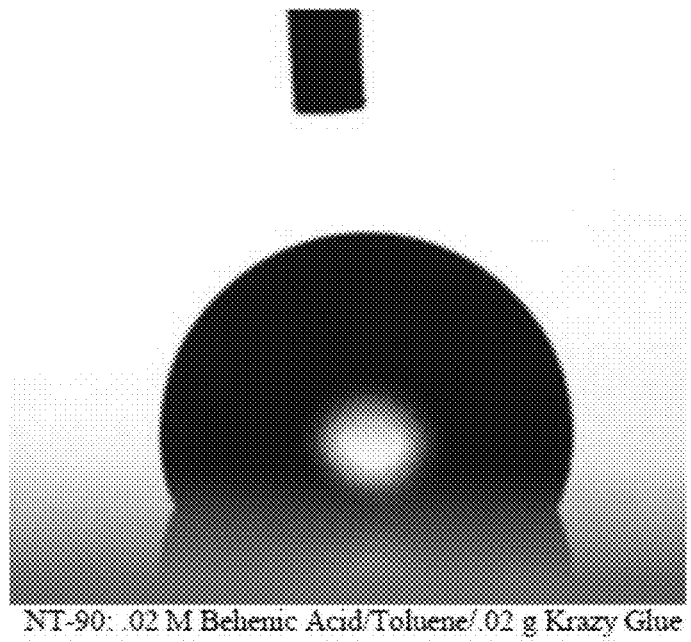
FIG. 2b: is a photograph of one embodiment exhibiting an average contact angle of 109.7 degrees.

Both of these slides exceeded the hydrophobicity requirement of 90°. This was an excellent step in the right direction, but not quite up to the RAIN-X® standard of 110 degrees. Further characterization revealed that NT-89 had an average contact angle of 108.1 degrees, and NT-90 had even better results, showing an average contact angle of 109.7 degrees (See FIG. 2).

Since the desired contact angle was achieved, the three slides with the highest contact angles were then characterized to determine their level of optical transparency. This was accomplished by using UV-Vis transmission spectroscopy. As a control, an uncoated slide was tested first and showed a transmittance of 91.302 at a wavelength of 800 nm. At the same wavelength NT-82 had a transmittance of 89.712, NT-89 had a transmittance of 88.74, and NT-90 had a transmittance of 88.779 (See FIG. 3).

Figure 3:
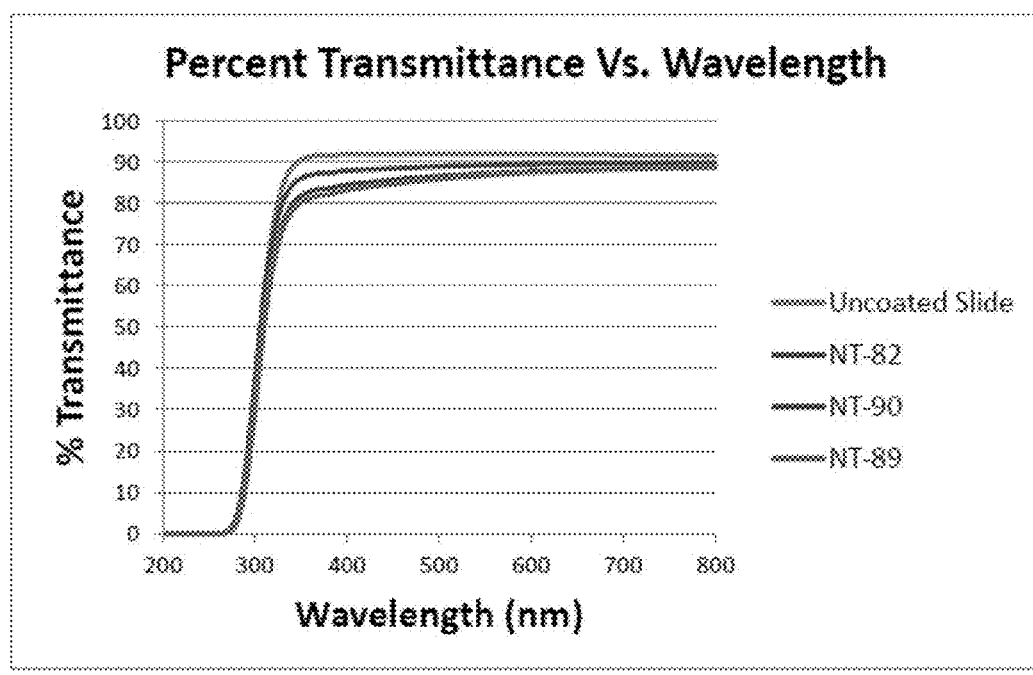
FIG. 3 is a chart plotting percent transmittance against wavelength for an uncoated slide and three slides coated with various embodiments.

FIG. 3 shows that the two slides with higher contact angles were slightly less transparent than the slide with a lower contact angle. This was expected, and even so, at 800 nm, all three slides are very close to the transmittance of the uncoated slide. This result shows that the developed coatings, in addition to being hydrophobic, are virtually transparent as well. In particular, sample NT-90 showed a contact angle almost identical to that of RAIN-X®, and the transmittance data verified its level of transparency. Table 3 summarizes the data plotted in FIG. 3. In Table 3, "WL" is an abbreviation for "Wavelength" and "T" is an abbreviation of "Transmittance".

TABLE 3

| NT-82 | | NT-89 | | NT-90 | | Uncoated Slide | |
|---|---|---|---|---|---|---|---|
| WL (nm) | % T | WL (nm) | % T | WL (nm) | % T | WL (nm) | % T |
| 799.95 | 89.71 | 799.95 | 88.74 | 799.95 | 88.78 | 799.95 | 91.30 |
| 798.98 | 90.00 | 798.98 | 88.83 | 798.98 | 88.87 | 798.98 | 91.49 |
| 798.01 | 89.86 | 798.01 | 88.68 | 798.01 | 88.83 | 798.01 | 91.34 |
| 797.03 | 89.91 | 797.03 | 88.77 | 797.03 | 88.88 | 797.03 | 91.57 |
| 796.06 | 89.85 | 796.06 | 88.87 | 796.06 | 88.93 | 796.06 | 91.51 |
| 794.95 | 89.85 | 794.95 | 88.85 | 794.95 | 88.88 | 794.95 | 91.50 |
| 793.97 | 89.75 | 793.97 | 88.79 | 793.97 | 88.93 | 793.97 | 91.43 |
| 793.00 | 89.93 | 793.00 | 88.79 | 793.00 | 88.92 | 793.00 | 91.60 |
| 792.03 | 89.98 | 792.03 | 88.83 | 792.03 | 88.80 | 792.03 | 91.45 |
| 791.05 | 89.79 | 791.05 | 88.72 | 791.05 | 88.78 | 791.05 | 91.43 |
| 789.94 | 89.82 | 789.94 | 88.77 | 789.94 | 88.84 | 789.94 | 91.43 |
| 788.96 | 89.82 | 788.96 | 88.72 | 788.96 | 88.87 | 788.96 | 91.44 |
| 787.99 | 89.84 | 787.99 | 88.72 | 787.99 | 88.84 | 787.99 | 91.48 |
| 787.01 | 89.85 | 787.01 | 88.74 | 787.01 | 88.84 | 787.01 | 91.64 |
| 786.03 | 89.75 | 786.03 | 88.71 | 786.03 | 88.69 | 786.03 | 91.43 |
| 785.06 | 89.87 | 785.06 | 88.73 | 785.06 | 88.72 | 785.06 | 91.50 |
| 783.94 | 89.91 | 783.94 | 88.65 | 783.94 | 88.80 | 783.94 | 91.54 |
| 782.96 | 89.76 | 782.96 | 88.59 | 782.96 | 88.74 | 782.96 | 91.44 |
| 781.98 | 89.80 | 781.98 | 88.78 | 781.98 | 88.87 | 781.98 | 91.45 |
| 781.01 | 89.82 | 781.01 | 88.75 | 781.01 | 88.79 | 781.01 | 91.57 |
| 780.03 | 89.84 | 780.03 | 88.74 | 780.03 | 88.78 | 780.03 | 91.53 |
| 779.05 | 89.92 | 779.05 | 88.69 | 779.05 | 88.77 | 779.05 | 91.53 |
| 778.07 | 89.84 | 778.07 | 88.65 | 778.07 | 88.80 | 778.07 | 91.63 |
| 776.95 | 89.82 | 776.95 | 88.58 | 776.95 | 88.79 | 776.95 | 91.52 |
| 775.97 | 89.96 | 775.97 | 88.63 | 775.97 | 88.81 | 775.97 | 91.58 |
| 774.99 | 90.06 | 774.99 | 88.69 | 774.99 | 88.84 | 774.99 | 91.73 |
| 774.01 | 89.81 | 774.01 | 88.60 | 774.01 | 88.74 | 774.01 | 91.57 |
| 773.02 | 89.81 | 773.02 | 88.62 | 773.02 | 88.80 | 773.02 | 91.54 |
| 772.04 | 89.83 | 772.04 | 88.70 | 772.04 | 88.75 | 772.04 | 91.56 |
| 771.06 | 89.76 | 771.06 | 88.71 | 771.06 | 88.71 | 771.06 | 91.56 |
| 769.94 | 89.73 | 769.94 | 88.70 | 769.94 | 88.76 | 769.94 | 91.56 |
| 768.95 | 89.87 | 768.95 | 88.54 | 768.95 | 88.73 | 768.95 | 91.63 |
| 767.97 | 89.80 | 767.97 | 88.48 | 767.97 | 88.68 | 767.97 | 91.45 |
| 766.99 | 89.85 | 766.99 | 88.63 | 766.99 | 88.77 | 766.99 | 91.50 |
| 766.00 | 89.86 | 766.00 | 88.71 | 766.00 | 88.78 | 766.00 | 91.65 |
| 765.02 | 89.82 | 765.02 | 88.59 | 765.02 | 88.76 | 765.02 | 91.52 |
| 764.03 | 89.74 | 764.03 | 88.56 | 764.03 | 88.68 | 764.03 | 91.55 |
| 763.05 | 89.83 | 763.05 | 88.64 | 763.05 | 88.64 | 763.05 | 91.59 |
| 762.06 | 89.84 | 762.06 | 88.62 | 762.06 | 88.66 | 762.06 | 91.62 |
| 760.94 | 89.84 | 760.94 | 88.57 | 760.94 | 88.77 | 760.94 | 91.50 |
| 759.95 | 89.78 | 759.95 | 88.58 | 759.95 | 88.74 | 759.95 | 91.58 |
| 758.96 | 89.85 | 758.96 | 88.63 | 758.96 | 88.75 | 758.96 | 91.56 |
| 757.98 | 89.92 | 757.98 | 88.65 | 757.98 | 88.73 | 757.98 | 91.54 |
| 756.99 | 89.90 | 756.99 | 88.64 | 756.99 | 88.73 | 756.99 | 91.68 |
| 756.00 | 89.85 | 756.00 | 88.62 | 756.00 | 88.67 | 756.00 | 91.54 |
| 755.01 | 89.82 | 755.01 | 88.61 | 755.01 | 88.62 | 755.01 | 91.48 |
| 754.03 | 89.78 | 754.03 | 88.59 | 754.03 | 88.69 | 754.03 | 91.51 |
| 753.04 | 89.89 | 753.04 | 88.56 | 753.04 | 88.73 | 753.04 | 91.67 |
| 752.05 | 89.82 | 752.05 | 88.58 | 752.05 | 88.62 | 752.05 | 91.55 |
| 751.06 | 89.94 | 751.06 | 88.59 | 751.06 | 88.75 | 751.06 | 91.67 |

TABLE 3-continued

| NT-82 | | NT-89 | | NT-90 | | Uncoated Slide | |
|---|---|---|---|---|---|---|---|
| WL (nm) | % T | WL (nm) | % T | WL (nm) | % T | WL (nm) | % T |
| 750.07 | 89.90 | 750.07 | 88.58 | 750.07 | 88.70 | 750.07 | 91.57 |
| 748.94 | 89.78 | 748.94 | 88.45 | 748.94 | 88.63 | 748.94 | 91.46 |
| 747.95 | 89.80 | 747.95 | 88.47 | 747.95 | 88.56 | 747.95 | 91.45 |
| 746.95 | 89.84 | 746.95 | 88.54 | 746.95 | 88.67 | 746.95 | 91.61 |
| 745.96 | 89.89 | 745.96 | 88.57 | 745.96 | 88.78 | 745.96 | 91.62 |
| 744.97 | 89.79 | 744.97 | 88.53 | 744.97 | 88.70 | 744.97 | 91.53 |
| 743.98 | 89.88 | 743.98 | 88.51 | 743.98 | 88.63 | 743.98 | 91.59 |
| 742.99 | 89.79 | 742.99 | 88.51 | 742.99 | 88.62 | 742.99 | 91.57 |
| 741.99 | 89.94 | 741.99 | 88.63 | 741.99 | 88.65 | 741.99 | 91.58 |
| 741.00 | 89.83 | 741.00 | 88.58 | 741.00 | 88.71 | 741.00 | 91.66 |
| 740.01 | 89.77 | 740.01 | 88.44 | 740.01 | 88.69 | 740.01 | 91.63 |
| 739.01 | 89.90 | 739.01 | 88.41 | 739.01 | 88.62 | 739.01 | 91.60 |
| 738.02 | 89.83 | 738.02 | 88.55 | 738.02 | 88.75 | 738.02 | 91.66 |
| 737.03 | 89.83 | 737.03 | 88.49 | 737.03 | 88.61 | 737.03 | 91.62 |
| 736.03 | 89.79 | 736.03 | 88.51 | 736.03 | 88.66 | 736.03 | 91.63 |
| 735.04 | 89.75 | 735.04 | 88.47 | 735.04 | 88.62 | 735.04 | 91.62 |
| 734.04 | 89.78 | 734.04 | 88.46 | 734.04 | 88.64 | 734.04 | 91.61 |
| 733.04 | 89.77 | 733.04 | 88.45 | 733.04 | 88.68 | 733.04 | 91.61 |
| 732.05 | 89.79 | 732.05 | 88.44 | 732.05 | 88.58 | 732.05 | 91.56 |
| 731.05 | 89.82 | 731.05 | 88.46 | 731.05 | 88.69 | 731.05 | 91.65 |
| 730.06 | 89.80 | 730.06 | 88.43 | 730.06 | 88.63 | 730.06 | 91.51 |
| 729.06 | 89.75 | 729.06 | 88.38 | 729.06 | 88.59 | 729.06 | 91.60 |
| 728.06 | 89.79 | 728.06 | 88.39 | 728.06 | 88.57 | 728.06 | 91.55 |
| 727.06 | 89.78 | 727.06 | 88.42 | 727.06 | 88.56 | 727.06 | 91.62 |
| 726.06 | 89.74 | 726.06 | 88.43 | 726.06 | 88.66 | 726.06 | 91.64 |
| 725.07 | 89.73 | 725.07 | 88.39 | 725.07 | 88.57 | 725.07 | 91.60 |
| 724.07 | 89.79 | 724.07 | 88.40 | 724.07 | 88.62 | 724.07 | 91.62 |
| 723.07 | 89.79 | 723.07 | 88.46 | 723.07 | 88.61 | 723.07 | 91.64 |
| 722.07 | 89.77 | 722.07 | 88.38 | 722.07 | 88.58 | 722.07 | 91.58 |
| 721.07 | 89.76 | 721.07 | 88.40 | 721.07 | 88.60 | 721.07 | 91.65 |
| 720.07 | 89.75 | 720.07 | 88.32 | 720.07 | 88.59 | 720.07 | 91.64 |
| 719.07 | 89.74 | 719.07 | 88.32 | 719.07 | 88.54 | 719.07 | 91.63 |
| 718.07 | 89.79 | 718.07 | 88.37 | 718.07 | 88.59 | 718.07 | 91.68 |
| 717.06 | 89.83 | 717.06 | 88.39 | 717.06 | 88.62 | 717.06 | 91.69 |
| 716.06 | 89.80 | 716.06 | 88.33 | 716.06 | 88.53 | 716.06 | 91.62 |
| 715.06 | 89.78 | 715.06 | 88.34 | 715.06 | 88.55 | 715.06 | 91.64 |
| 714.06 | 89.77 | 714.06 | 88.34 | 714.06 | 88.59 | 714.06 | 91.68 |
| 713.06 | 89.76 | 713.06 | 88.30 | 713.06 | 88.55 | 713.06 | 91.68 |
| 712.05 | 89.78 | 712.05 | 88.38 | 712.05 | 88.57 | 712.05 | 91.66 |
| 711.05 | 89.77 | 711.05 | 88.32 | 711.05 | 88.56 | 711.05 | 91.66 |
| 710.05 | 89.81 | 710.05 | 88.29 | 710.05 | 88.50 | 710.05 | 91.62 |
| 709.04 | 89.71 | 709.04 | 88.26 | 709.04 | 88.46 | 709.04 | 91.64 |
| 708.04 | 89.76 | 708.04 | 88.32 | 708.04 | 88.51 | 708.04 | 91.70 |
| 707.03 | 89.75 | 707.03 | 88.33 | 707.03 | 88.51 | 707.03 | 91.68 |
| 706.03 | 89.77 | 706.03 | 88.32 | 706.03 | 88.49 | 706.03 | 91.71 |
| 705.02 | 89.69 | 705.02 | 88.27 | 705.02 | 88.46 | 705.02 | 91.67 |
| 704.02 | 89.78 | 704.02 | 88.31 | 704.02 | 88.55 | 704.02 | 91.73 |
| 703.01 | 89.69 | 703.01 | 88.30 | 703.01 | 88.50 | 703.01 | 91.67 |
| 702.00 | 89.73 | 702.00 | 88.27 | 702.00 | 88.50 | 702.00 | 91.69 |
| 701.00 | 89.71 | 701.00 | 88.25 | 701.00 | 88.48 | 701.00 | 91.69 |
| 699.99 | 89.74 | 699.99 | 88.24 | 699.99 | 88.51 | 699.99 | 91.70 |
| 698.98 | 89.76 | 698.98 | 88.26 | 698.98 | 88.48 | 698.98 | 91.71 |
| 697.98 | 89.68 | 697.98 | 88.26 | 697.98 | 88.40 | 697.98 | 91.65 |
| 696.97 | 89.72 | 696.97 | 88.23 | 696.97 | 88.43 | 696.97 | 91.68 |
| 695.96 | 89.72 | 695.96 | 88.26 | 695.96 | 88.44 | 695.96 | 91.63 |
| 694.95 | 89.73 | 694.95 | 88.26 | 694.95 | 88.41 | 694.95 | 91.70 |
| 693.94 | 89.76 | 693.94 | 88.20 | 693.94 | 88.47 | 693.94 | 91.71 |
| 692.93 | 89.78 | 692.93 | 88.20 | 692.93 | 88.45 | 692.93 | 91.73 |
| 692.07 | 89.69 | 692.07 | 88.21 | 692.07 | 88.38 | 692.07 | 91.73 |
| 691.06 | 89.73 | 691.06 | 88.21 | 691.06 | 88.41 | 691.06 | 91.71 |
| 690.05 | 89.68 | 690.05 | 88.20 | 690.05 | 88.40 | 690.05 | 91.73 |
| 689.04 | 89.72 | 689.04 | 88.19 | 689.04 | 88.37 | 689.04 | 91.67 |
| 688.03 | 89.71 | 688.03 | 88.17 | 688.03 | 88.46 | 688.03 | 91.68 |
| 687.01 | 89.63 | 687.01 | 88.15 | 687.01 | 88.33 | 687.01 | 91.76 |
| 686.00 | 89.70 | 686.00 | 88.15 | 686.00 | 88.42 | 686.00 | 91.74 |
| 684.99 | 89.76 | 684.99 | 88.20 | 684.99 | 88.38 | 684.99 | 91.73 |
| 683.98 | 89.68 | 683.98 | 88.22 | 683.98 | 88.43 | 683.98 | 91.75 |
| 682.97 | 89.70 | 682.97 | 88.17 | 682.97 | 88.46 | 682.97 | 91.80 |
| 681.95 | 89.68 | 681.95 | 88.15 | 681.95 | 88.38 | 681.95 | 91.73 |
| 680.94 | 89.73 | 680.94 | 88.14 | 680.94 | 88.36 | 680.94 | 91.76 |
| 680.07 | 89.73 | 680.07 | 88.18 | 680.07 | 88.38 | 680.07 | 91.82 |
| 679.06 | 89.70 | 679.06 | 88.08 | 679.06 | 88.37 | 679.06 | 91.69 |
| 678.04 | 89.67 | 678.04 | 88.18 | 678.04 | 88.32 | 678.04 | 91.78 |
| 677.03 | 89.73 | 677.03 | 88.16 | 677.03 | 88.38 | 677.03 | 91.82 |
| 676.01 | 89.70 | 676.01 | 88.09 | 676.01 | 88.33 | 676.01 | 91.72 |
| 675.00 | 89.73 | 675.00 | 88.11 | 675.00 | 88.29 | 675.00 | 91.76 |
| 673.98 | 89.67 | 673.98 | 88.14 | 673.98 | 88.30 | 673.98 | 91.79 |
| 672.97 | 89.73 | 672.97 | 88.17 | 672.97 | 88.31 | 672.97 | 91.79 |
| 671.95 | 89.67 | 671.95 | 88.09 | 671.95 | 88.26 | 671.95 | 91.80 |
| 670.94 | 89.74 | 670.94 | 88.07 | 670.94 | 88.27 | 670.94 | 91.78 |
| 670.07 | 89.70 | 670.07 | 88.13 | 670.07 | 88.30 | 670.07 | 91.74 |
| 669.05 | 89.67 | 669.05 | 88.10 | 669.05 | 88.28 | 669.05 | 91.86 |
| 668.03 | 89.70 | 668.03 | 88.10 | 668.03 | 88.30 | 668.03 | 91.81 |
| 667.01 | 89.76 | 667.01 | 88.09 | 667.01 | 88.32 | 667.01 | 91.81 |
| 666.00 | 89.75 | 666.00 | 88.12 | 666.00 | 88.29 | 666.00 | 91.88 |
| 664.98 | 89.66 | 664.98 | 88.02 | 664.98 | 88.26 | 664.98 | 91.78 |
| 663.96 | 89.66 | 663.96 | 88.02 | 663.96 | 88.25 | 663.96 | 91.74 |
| 662.94 | 89.71 | 662.94 | 88.03 | 662.94 | 88.27 | 662.94 | 91.80 |
| 662.07 | 89.61 | 662.07 | 87.95 | 662.07 | 88.20 | 662.07 | 91.73 |
| 661.05 | 89.64 | 661.05 | 87.99 | 661.05 | 88.23 | 661.05 | 91.75 |
| 660.03 | 89.64 | 660.03 | 88.02 | 660.03 | 88.21 | 660.03 | 91.77 |
| 659.01 | 89.57 | 659.01 | 87.91 | 659.01 | 88.12 | 659.01 | 91.71 |
| 657.99 | 89.62 | 657.99 | 87.99 | 657.99 | 88.25 | 657.99 | 91.79 |
| 656.97 | 89.60 | 656.97 | 87.90 | 656.97 | 88.14 | 656.97 | 91.77 |
| 655.95 | 89.67 | 655.95 | 87.96 | 655.95 | 88.18 | 655.95 | 91.81 |
| 655.07 | 89.61 | 655.07 | 87.93 | 655.07 | 88.13 | 655.07 | 91.76 |
| 654.05 | 89.68 | 654.05 | 87.96 | 654.05 | 88.28 | 654.05 | 91.85 |
| 653.03 | 89.63 | 653.03 | 87.94 | 653.03 | 88.22 | 653.03 | 91.83 |
| 652.01 | 89.65 | 652.01 | 87.93 | 652.01 | 88.17 | 652.01 | 91.80 |
| 650.98 | 89.66 | 650.98 | 87.93 | 650.98 | 88.19 | 650.98 | 91.84 |
| 649.96 | 89.57 | 649.96 | 87.91 | 649.96 | 88.12 | 649.96 | 91.80 |
| 648.94 | 89.63 | 648.94 | 87.93 | 648.94 | 88.18 | 648.94 | 91.83 |
| 648.06 | 89.63 | 648.06 | 87.93 | 648.06 | 88.19 | 648.06 | 91.84 |
| 647.04 | 89.61 | 647.04 | 87.90 | 647.04 | 88.16 | 647.04 | 91.78 |
| 646.01 | 89.61 | 646.01 | 87.90 | 646.01 | 88.18 | 646.01 | 91.84 |
| 644.99 | 89.58 | 644.99 | 87.91 | 644.99 | 88.11 | 644.99 | 91.85 |
| 643.96 | 89.65 | 643.96 | 87.84 | 643.96 | 88.13 | 643.96 | 91.83 |
| 642.94 | 89.62 | 642.94 | 87.79 | 642.94 | 88.11 | 642.94 | 91.82 |
| 642.06 | 89.55 | 642.06 | 87.79 | 642.06 | 88.09 | 642.06 | 91.72 |
| 641.03 | 89.70 | 641.03 | 87.91 | 641.03 | 88.15 | 641.03 | 91.94 |
| 640.01 | 89.61 | 640.01 | 87.83 | 640.01 | 88.05 | 640.01 | 91.83 |
| 638.98 | 89.57 | 638.98 | 87.79 | 638.98 | 88.07 | 638.98 | 91.81 |
| 637.96 | 89.65 | 637.96 | 87.82 | 637.96 | 88.09 | 637.96 | 91.82 |
| 636.93 | 89.59 | 636.93 | 87.80 | 636.93 | 88.08 | 636.93 | 91.85 |
| 636.05 | 89.56 | 636.05 | 87.79 | 636.05 | 88.02 | 636.05 | 91.78 |
| 635.02 | 89.63 | 635.02 | 87.82 | 635.02 | 88.04 | 635.02 | 91.89 |
| 634.00 | 89.63 | 634.00 | 87.76 | 634.00 | 88.04 | 634.00 | 91.88 |
| 632.97 | 89.56 | 632.97 | 87.79 | 632.97 | 88.00 | 632.97 | 91.84 |
| 631.94 | 89.61 | 631.94 | 87.76 | 631.94 | 88.02 | 631.94 | 91.86 |
| 631.06 | 89.56 | 631.06 | 87.73 | 631.06 | 88.03 | 631.06 | 91.80 |
| 630.03 | 89.58 | 630.03 | 87.74 | 630.03 | 88.07 | 630.03 | 91.83 |
| 629.00 | 89.59 | 629.00 | 87.72 | 629.00 | 88.04 | 629.00 | 91.87 |
| 627.97 | 89.55 | 627.97 | 87.72 | 627.97 | 88.02 | 627.97 | 91.80 |
| 626.94 | 89.58 | 626.94 | 87.66 | 626.94 | 87.98 | 626.94 | 91.88 |
| 626.06 | 89.56 | 626.06 | 87.71 | 626.06 | 88.01 | 626.06 | 91.87 |
| 625.03 | 89.53 | 625.03 | 87.63 | 625.03 | 87.95 | 625.03 | 91.81 |
| 624.00 | 89.55 | 624.00 | 87.69 | 624.00 | 87.97 | 624.00 | 91.91 |
| 622.97 | 89.58 | 622.97 | 87.63 | 622.97 | 88.00 | 622.97 | 91.85 |
| 621.94 | 89.60 | 621.94 | 87.67 | 621.94 | 87.96 | 621.94 | 91.89 |
| 621.05 | 89.57 | 621.05 | 87.66 | 621.05 | 87.97 | 621.05 | 91.90 |
| 620.02 | 89.53 | 620.02 | 87.65 | 620.02 | 87.97 | 620.02 | 91.87 |
| 618.99 | 89.58 | 618.99 | 87.65 | 618.99 | 87.96 | 618.99 | 91.96 |
| 617.96 | 89.54 | 617.96 | 87.59 | 617.96 | 87.91 | 617.96 | 91.85 |
| 616.93 | 89.58 | 616.93 | 87.62 | 616.93 | 87.93 | 616.93 | 91.91 |
| 616.04 | 89.52 | 616.04 | 87.56 | 616.04 | 87.94 | 616.04 | 91.88 |
| 615.01 | 89.51 | 615.01 | 87.56 | 615.01 | 87.91 | 615.01 | 91.91 |
| 613.98 | 89.57 | 613.98 | 87.62 | 613.98 | 87.94 | 613.98 | 91.87 |
| 612.94 | 89.57 | 612.94 | 87.56 | 612.94 | 87.92 | 612.94 | 91.93 |
| 612.06 | 89.52 | 612.06 | 87.57 | 612.06 | 87.89 | 612.06 | 91.85 |
| 611.02 | 89.56 | 611.02 | 87.53 | 611.02 | 87.92 | 611.02 | 91.93 |
| 609.99 | 89.57 | 609.99 | 87.53 | 609.99 | 87.86 | 609.99 | 91.88 |
| 608.95 | 89.55 | 608.95 | 87.53 | 608.95 | 87.90 | 608.95 | 91.91 |
| 608.07 | 89.55 | 608.07 | 87.53 | 608.07 | 87.86 | 608.07 | 91.95 |
| 607.03 | 89.54 | 607.03 | 87.53 | 607.03 | 87.85 | 607.03 | 91.90 |
| 606.00 | 89.48 | 606.00 | 87.50 | 606.00 | 87.83 | 606.00 | 91.89 |
| 604.96 | 89.55 | 604.96 | 87.47 | 604.96 | 87.85 | 604.96 | 91.93 |
| 604.07 | 89.49 | 604.07 | 87.47 | 604.07 | 87.82 | 604.07 | 91.89 |
| 603.04 | 89.51 | 603.04 | 87.49 | 603.04 | 87.87 | 603.04 | 91.93 |

TABLE 3-continued

| NT-82 | | NT-89 | | NT-90 | | Uncoated Slide | |
|---|---|---|---|---|---|---|---|
| WL (nm) | % T | WL (nm) | % T | WL (nm) | % T | WL (nm) | % T |
| 602.00 | 89.52 | 602.00 | 87.45 | 602.00 | 87.84 | 602.00 | 91.93 |
| 600.96 | 89.47 | 600.96 | 87.44 | 600.96 | 87.85 | 600.96 | 91.90 |
| 600.07 | 89.47 | 600.07 | 87.39 | 600.07 | 87.78 | 600.07 | 91.87 |
| 599.04 | 89.48 | 599.04 | 87.38 | 599.04 | 87.82 | 599.04 | 91.94 |
| 598.00 | 89.47 | 598.00 | 87.38 | 598.00 | 87.78 | 598.00 | 91.90 |
| 596.96 | 89.43 | 596.96 | 87.36 | 596.96 | 87.76 | 596.96 | 91.89 |
| 596.07 | 89.45 | 596.07 | 87.40 | 596.07 | 87.71 | 596.07 | 91.89 |
| 595.03 | 89.48 | 595.03 | 87.41 | 595.03 | 87.78 | 595.03 | 91.91 |
| 593.99 | 89.49 | 593.99 | 87.33 | 593.99 | 87.72 | 593.99 | 91.94 |
| 592.95 | 89.46 | 592.95 | 87.36 | 592.95 | 87.77 | 592.95 | 91.95 |
| 592.06 | 89.46 | 592.06 | 87.34 | 592.06 | 87.70 | 592.06 | 91.92 |
| 591.02 | 89.47 | 591.02 | 87.31 | 591.02 | 87.66 | 591.02 | 91.91 |
| 589.98 | 89.46 | 589.98 | 87.35 | 589.98 | 87.73 | 589.98 | 91.92 |
| 588.94 | 89.49 | 588.94 | 87.33 | 588.94 | 87.70 | 588.94 | 91.99 |
| 588.05 | 89.42 | 588.05 | 87.30 | 588.05 | 87.68 | 588.05 | 91.91 |
| 587.01 | 89.42 | 587.01 | 87.27 | 587.01 | 87.66 | 587.01 | 91.93 |
| 585.97 | 89.44 | 585.97 | 87.26 | 585.97 | 87.69 | 585.97 | 91.93 |
| 584.93 | 89.42 | 584.93 | 87.25 | 584.93 | 87.67 | 584.93 | 91.99 |
| 584.04 | 89.40 | 584.04 | 87.23 | 584.04 | 87.64 | 584.04 | 91.92 |
| 583.00 | 89.42 | 583.00 | 87.19 | 583.00 | 87.62 | 583.00 | 91.94 |
| 581.95 | 89.42 | 581.95 | 87.20 | 581.95 | 87.61 | 581.95 | 91.94 |
| 581.06 | 89.39 | 581.06 | 87.16 | 581.06 | 87.60 | 581.06 | 91.92 |
| 580.02 | 89.40 | 580.02 | 87.16 | 580.02 | 87.58 | 580.02 | 91.95 |
| 578.98 | 89.41 | 578.98 | 87.18 | 578.98 | 87.63 | 578.98 | 91.96 |
| 577.93 | 89.41 | 577.93 | 87.13 | 577.93 | 87.57 | 577.93 | 91.92 |
| 577.04 | 89.37 | 577.04 | 87.10 | 577.04 | 87.58 | 577.04 | 91.94 |
| 576.00 | 89.38 | 576.00 | 87.12 | 576.00 | 87.56 | 576.00 | 91.93 |
| 574.95 | 89.40 | 574.95 | 87.10 | 574.95 | 87.57 | 574.95 | 92.00 |
| 574.06 | 89.36 | 574.06 | 87.08 | 574.06 | 87.53 | 574.06 | 91.92 |
| 573.01 | 89.38 | 573.01 | 87.09 | 573.01 | 87.53 | 573.01 | 91.94 |
| 571.97 | 89.38 | 571.97 | 87.07 | 571.97 | 87.51 | 571.97 | 91.96 |
| 571.07 | 89.36 | 571.07 | 87.04 | 571.07 | 87.47 | 571.07 | 91.92 |
| 570.03 | 89.34 | 570.03 | 87.04 | 570.03 | 87.49 | 570.03 | 91.95 |
| 568.98 | 89.36 | 568.98 | 87.03 | 568.98 | 87.53 | 568.98 | 91.98 |
| 567.94 | 89.33 | 567.94 | 87.00 | 567.94 | 87.47 | 567.94 | 91.96 |
| 567.04 | 89.34 | 567.04 | 86.97 | 567.04 | 87.44 | 567.04 | 91.94 |
| 565.99 | 89.32 | 565.99 | 87.01 | 565.99 | 87.46 | 565.99 | 91.97 |
| 564.95 | 89.32 | 564.95 | 86.97 | 564.95 | 87.47 | 564.95 | 91.96 |
| 564.05 | 89.35 | 564.05 | 86.97 | 564.05 | 87.44 | 564.05 | 91.95 |
| 563.00 | 89.32 | 563.00 | 86.93 | 563.00 | 87.44 | 563.00 | 91.94 |
| 561.96 | 89.30 | 561.96 | 86.96 | 561.96 | 87.38 | 561.96 | 91.96 |
| 561.06 | 89.30 | 561.06 | 86.95 | 561.06 | 87.43 | 561.06 | 92.00 |
| 560.01 | 89.33 | 560.01 | 86.89 | 560.01 | 87.39 | 560.01 | 91.99 |
| 558.96 | 89.29 | 558.96 | 86.93 | 558.96 | 87.41 | 558.96 | 91.96 |
| 558.07 | 89.32 | 558.07 | 86.88 | 558.07 | 87.38 | 558.07 | 91.97 |
| 557.02 | 89.33 | 557.02 | 86.88 | 557.02 | 87.39 | 557.02 | 91.97 |
| 555.97 | 89.29 | 555.97 | 86.84 | 555.97 | 87.37 | 555.97 | 91.99 |
| 555.07 | 89.28 | 555.07 | 86.79 | 555.07 | 87.33 | 555.07 | 91.98 |
| 554.02 | 89.27 | 554.02 | 86.80 | 554.02 | 87.32 | 554.02 | 91.99 |
| 552.97 | 89.27 | 552.97 | 86.79 | 552.97 | 87.32 | 552.97 | 91.96 |
| 552.07 | 89.24 | 552.07 | 86.75 | 552.07 | 87.27 | 552.07 | 91.97 |
| 551.02 | 89.25 | 551.02 | 86.77 | 551.02 | 87.28 | 551.02 | 91.97 |
| 549.97 | 89.27 | 549.97 | 86.76 | 549.97 | 87.30 | 549.97 | 91.99 |
| 549.07 | 89.27 | 549.07 | 86.68 | 549.07 | 87.29 | 549.07 | 91.96 |
| 548.02 | 89.25 | 548.02 | 86.73 | 548.02 | 87.28 | 548.02 | 91.99 |
| 546.97 | 89.24 | 546.97 | 86.69 | 546.97 | 87.24 | 546.97 | 91.97 |
| 546.07 | 89.26 | 546.07 | 86.69 | 546.07 | 87.24 | 546.07 | 92.02 |
| 545.02 | 89.23 | 545.02 | 86.63 | 545.02 | 87.23 | 545.02 | 91.96 |
| 543.97 | 89.24 | 543.97 | 86.67 | 543.97 | 87.24 | 543.97 | 91.99 |
| 543.07 | 89.21 | 543.07 | 86.62 | 543.07 | 87.21 | 543.07 | 91.99 |
| 542.01 | 89.23 | 542.01 | 86.65 | 542.01 | 87.16 | 542.01 | 91.99 |
| 540.96 | 89.23 | 540.96 | 86.62 | 540.96 | 87.15 | 540.96 | 91.98 |
| 540.06 | 89.21 | 540.06 | 86.59 | 540.06 | 87.15 | 540.06 | 91.97 |
| 539.01 | 89.18 | 539.01 | 86.56 | 539.01 | 87.15 | 539.01 | 91.96 |
| 537.95 | 89.19 | 537.95 | 86.53 | 537.95 | 87.13 | 537.95 | 91.97 |
| 537.05 | 89.20 | 537.05 | 86.55 | 537.05 | 87.11 | 537.05 | 91.99 |
| 536.00 | 89.18 | 536.00 | 86.48 | 536.00 | 87.13 | 536.00 | 91.97 |
| 534.94 | 89.17 | 534.94 | 86.48 | 534.94 | 87.14 | 534.94 | 91.98 |
| 534.04 | 89.16 | 534.04 | 86.52 | 534.04 | 87.08 | 534.04 | 91.98 |
| 532.99 | 89.16 | 532.99 | 86.48 | 532.99 | 87.04 | 532.99 | 91.97 |
| 531.93 | 89.14 | 531.93 | 86.42 | 531.93 | 87.07 | 531.93 | 91.97 |
| 531.03 | 89.14 | 531.03 | 86.40 | 531.03 | 87.07 | 531.03 | 91.95 |
| 529.97 | 89.13 | 529.97 | 86.39 | 529.97 | 87.02 | 529.97 | 91.97 |
| 529.07 | 89.13 | 529.07 | 86.40 | 529.07 | 86.97 | 529.07 | 91.96 |
| 528.01 | 89.16 | 528.01 | 86.40 | 528.01 | 87.01 | 528.01 | 91.98 |
| 526.96 | 89.17 | 526.96 | 86.39 | 526.96 | 87.00 | 526.96 | 92.01 |
| 526.05 | 89.12 | 526.05 | 86.35 | 526.05 | 86.96 | 526.05 | 91.97 |
| 525.00 | 89.10 | 525.00 | 86.33 | 525.00 | 86.95 | 525.00 | 91.98 |
| 523.94 | 89.12 | 523.94 | 86.30 | 523.94 | 86.95 | 523.94 | 91.98 |
| 523.03 | 89.14 | 523.03 | 86.32 | 523.03 | 86.88 | 523.03 | 91.97 |
| 521.98 | 89.09 | 521.98 | 86.26 | 521.98 | 86.92 | 521.98 | 91.97 |
| 521.07 | 89.11 | 521.07 | 86.25 | 521.07 | 86.95 | 521.07 | 92.02 |
| 520.01 | 89.08 | 520.01 | 86.24 | 520.01 | 86.92 | 520.01 | 91.99 |
| 518.96 | 89.07 | 518.96 | 86.20 | 518.96 | 86.86 | 518.96 | 91.95 |
| 518.05 | 89.08 | 518.05 | 86.21 | 518.05 | 86.87 | 518.05 | 91.98 |
| 516.99 | 89.13 | 516.99 | 86.22 | 516.99 | 86.91 | 516.99 | 92.04 |
| 515.93 | 89.09 | 515.93 | 86.19 | 515.93 | 86.84 | 515.93 | 92.00 |
| 515.03 | 89.10 | 515.03 | 86.20 | 515.03 | 86.84 | 515.03 | 92.02 |
| 513.97 | 89.07 | 513.97 | 86.17 | 513.97 | 86.84 | 513.97 | 92.01 |
| 513.06 | 89.08 | 513.06 | 86.17 | 513.06 | 86.86 | 513.06 | 92.02 |
| 512.00 | 89.04 | 512.00 | 86.14 | 512.00 | 86.79 | 512.00 | 91.97 |
| 510.94 | 89.01 | 510.94 | 86.08 | 510.94 | 86.75 | 510.94 | 91.95 |
| 510.03 | 89.01 | 510.03 | 86.05 | 510.03 | 86.73 | 510.03 | 91.95 |
| 508.97 | 89.00 | 508.97 | 86.03 | 508.97 | 86.73 | 508.97 | 91.95 |
| 508.07 | 89.03 | 508.07 | 86.04 | 508.07 | 86.74 | 508.07 | 92.00 |
| 507.01 | 88.97 | 507.01 | 86.02 | 507.01 | 86.71 | 507.01 | 92.00 |
| 505.95 | 89.03 | 505.95 | 86.02 | 505.95 | 86.72 | 505.95 | 92.00 |
| 505.04 | 88.99 | 505.04 | 85.99 | 505.04 | 86.68 | 505.04 | 91.98 |
| 503.98 | 88.95 | 503.98 | 85.95 | 503.98 | 86.64 | 503.98 | 91.95 |
| 503.07 | 88.97 | 503.07 | 85.96 | 503.07 | 86.65 | 503.07 | 91.99 |
| 502.00 | 88.95 | 502.00 | 85.89 | 502.00 | 86.63 | 502.00 | 91.92 |
| 500.94 | 88.97 | 500.94 | 85.89 | 500.94 | 86.62 | 500.94 | 91.98 |
| 500.03 | 88.96 | 500.03 | 85.87 | 500.03 | 86.57 | 500.03 | 91.97 |
| 498.97 | 88.92 | 498.97 | 85.83 | 498.97 | 86.59 | 498.97 | 91.95 |
| 498.06 | 88.90 | 498.06 | 85.81 | 498.06 | 86.53 | 498.06 | 91.95 |
| 497.00 | 88.92 | 497.00 | 85.80 | 497.00 | 86.49 | 497.00 | 91.96 |
| 495.94 | 88.92 | 495.94 | 85.78 | 495.94 | 86.56 | 495.94 | 91.99 |
| 495.02 | 88.92 | 495.02 | 85.77 | 495.02 | 86.53 | 495.02 | 91.99 |
| 493.96 | 88.90 | 493.96 | 85.70 | 493.96 | 86.53 | 493.96 | 91.97 |
| 493.05 | 88.88 | 493.05 | 85.71 | 493.05 | 86.49 | 493.05 | 91.99 |
| 491.99 | 88.88 | 491.99 | 85.74 | 491.99 | 86.44 | 491.99 | 91.97 |
| 491.07 | 88.84 | 491.07 | 85.63 | 491.07 | 86.43 | 491.07 | 91.96 |
| 490.01 | 88.85 | 490.01 | 85.62 | 490.01 | 86.43 | 490.01 | 91.97 |
| 488.95 | 88.87 | 488.95 | 85.65 | 488.95 | 86.40 | 488.95 | 91.98 |
| 488.03 | 88.87 | 488.03 | 85.65 | 488.03 | 86.38 | 488.03 | 91.94 |
| 486.97 | 88.86 | 486.97 | 85.60 | 486.97 | 86.36 | 486.97 | 91.98 |
| 486.06 | 88.81 | 486.06 | 85.55 | 486.06 | 86.42 | 486.06 | 91.99 |
| 484.99 | 88.81 | 484.99 | 85.57 | 484.99 | 86.33 | 484.99 | 91.96 |
| 483.93 | 88.80 | 483.93 | 85.55 | 483.93 | 86.26 | 483.93 | 91.96 |
| 483.01 | 88.83 | 483.01 | 85.53 | 483.01 | 86.30 | 483.01 | 91.97 |
| 481.95 | 88.80 | 481.95 | 85.50 | 481.95 | 86.27 | 481.95 | 91.98 |
| 481.03 | 88.81 | 481.03 | 85.49 | 481.03 | 86.27 | 481.03 | 92.00 |
| 479.97 | 88.78 | 479.97 | 85.42 | 479.97 | 86.23 | 479.97 | 91.97 |
| 479.05 | 88.77 | 479.05 | 85.41 | 479.05 | 86.22 | 479.05 | 91.94 |
| 477.99 | 88.74 | 477.99 | 85.40 | 477.99 | 86.21 | 477.99 | 91.96 |
| 477.07 | 88.73 | 477.07 | 85.35 | 477.07 | 86.16 | 477.07 | 91.93 |
| 476.01 | 88.74 | 476.01 | 85.34 | 476.01 | 86.16 | 476.01 | 91.95 |
| 474.94 | 88.74 | 474.94 | 85.31 | 474.94 | 86.14 | 474.94 | 91.95 |
| 474.02 | 88.72 | 474.02 | 85.28 | 474.02 | 86.14 | 474.02 | 91.95 |
| 472.96 | 88.71 | 472.96 | 85.28 | 472.96 | 86.13 | 472.96 | 91.96 |
| 472.04 | 88.72 | 472.04 | 85.25 | 472.04 | 86.10 | 472.04 | 91.96 |
| 470.97 | 88.67 | 470.97 | 85.20 | 470.97 | 86.07 | 470.97 | 91.94 |
| 470.06 | 88.66 | 470.06 | 85.17 | 470.06 | 86.05 | 470.06 | 91.94 |
| 468.99 | 88.66 | 468.99 | 85.16 | 468.99 | 86.06 | 468.99 | 91.98 |
| 468.07 | 88.70 | 468.07 | 85.18 | 468.07 | 86.08 | 468.07 | 91.95 |
| 467.00 | 88.67 | 467.00 | 85.17 | 467.00 | 86.02 | 467.00 | 91.97 |
| 465.93 | 88.63 | 465.93 | 85.11 | 465.93 | 85.99 | 465.93 | 91.95 |
| 465.02 | 88.64 | 465.02 | 85.07 | 465.02 | 85.97 | 465.02 | 91.96 |
| 463.95 | 88.64 | 463.95 | 85.06 | 463.95 | 85.97 | 463.95 | 91.96 |
| 463.03 | 88.61 | 463.03 | 84.94 | 463.03 | 85.97 | 463.03 | 91.96 |
| 461.96 | 88.64 | 461.96 | 85.03 | 461.96 | 85.97 | 461.96 | 91.97 |
| 461.04 | 88.63 | 461.04 | 84.99 | 461.04 | 85.91 | 461.04 | 91.93 |
| 459.97 | 88.62 | 459.97 | 85.00 | 459.97 | 85.84 | 459.97 | 91.94 |
| 459.06 | 88.59 | 459.06 | 84.93 | 459.06 | 85.83 | 459.06 | 91.92 |
| 457.99 | 88.58 | 457.99 | 84.92 | 457.99 | 85.82 | 457.99 | 91.95 |
| 457.07 | 88.55 | 457.07 | 84.87 | 457.07 | 85.80 | 457.07 | 91.92 |
| 456.00 | 88.53 | 456.00 | 84.82 | 456.00 | 85.79 | 456.00 | 91.94 |
| 454.93 | 88.51 | 454.93 | 84.80 | 454.93 | 85.76 | 454.93 | 91.92 |

TABLE 3-continued

| NT-82 WL (nm) | % T | NT-89 WL (nm) | % T | NT-90 WL (nm) | % T | Uncoated Slide WL (nm) | % T |
|---|---|---|---|---|---|---|---|
| 454.01 | 88.49 | 454.01 | 84.77 | 454.01 | 85.73 | 454.01 | 91.91 |
| 452.93 | 88.49 | 452.93 | 84.78 | 452.93 | 85.69 | 452.93 | 91.92 |
| 452.02 | 88.49 | 452.02 | 84.73 | 452.02 | 85.67 | 452.02 | 91.90 |
| 450.94 | 88.50 | 450.94 | 84.66 | 450.94 | 85.66 | 450.94 | 91.89 |
| 450.02 | 88.45 | 450.02 | 84.65 | 450.02 | 85.66 | 450.02 | 91.89 |
| 448.95 | 88.46 | 448.95 | 84.65 | 448.95 | 85.62 | 448.95 | 91.87 |
| 448.03 | 88.46 | 448.03 | 84.60 | 448.03 | 85.56 | 448.03 | 91.90 |
| 446.96 | 88.41 | 446.96 | 84.58 | 446.96 | 85.54 | 446.96 | 91.88 |
| 446.04 | 88.42 | 446.04 | 84.58 | 446.04 | 85.54 | 446.04 | 91.86 |
| 444.97 | 88.39 | 444.97 | 84.54 | 444.97 | 85.52 | 444.97 | 91.85 |
| 444.05 | 88.37 | 444.05 | 84.51 | 444.05 | 85.45 | 444.05 | 91.84 |
| 442.97 | 88.37 | 442.97 | 84.49 | 442.97 | 85.47 | 442.97 | 91.89 |
| 442.05 | 88.37 | 442.05 | 84.45 | 442.05 | 85.46 | 442.05 | 91.92 |
| 440.98 | 88.35 | 440.98 | 84.43 | 440.98 | 85.42 | 440.98 | 91.86 |
| 440.06 | 88.37 | 440.06 | 84.42 | 440.06 | 85.42 | 440.06 | 91.89 |
| 438.98 | 88.33 | 438.98 | 84.39 | 438.98 | 85.38 | 438.98 | 91.85 |
| 438.06 | 88.32 | 438.06 | 84.36 | 438.06 | 85.35 | 438.06 | 91.89 |
| 436.99 | 88.31 | 436.99 | 84.31 | 436.99 | 85.34 | 436.99 | 91.88 |
| 436.07 | 88.32 | 436.07 | 84.29 | 436.07 | 85.32 | 436.07 | 91.89 |
| 434.99 | 88.31 | 434.99 | 84.26 | 434.99 | 85.30 | 434.99 | 91.88 |
| 434.07 | 88.30 | 434.07 | 84.25 | 434.07 | 85.28 | 434.07 | 91.88 |
| 432.99 | 88.27 | 432.99 | 84.22 | 432.99 | 85.26 | 432.99 | 91.87 |
| 432.07 | 88.28 | 432.07 | 84.20 | 432.07 | 85.24 | 432.07 | 91.89 |
| 431.00 | 88.26 | 431.00 | 84.15 | 431.00 | 85.22 | 431.00 | 91.89 |
| 430.07 | 88.26 | 430.07 | 84.16 | 430.07 | 85.22 | 430.07 | 91.91 |
| 429.00 | 88.24 | 429.00 | 84.10 | 429.00 | 85.16 | 429.00 | 91.88 |
| 428.07 | 88.22 | 428.07 | 84.09 | 428.07 | 85.15 | 428.07 | 91.85 |
| 427.00 | 88.17 | 427.00 | 84.02 | 427.00 | 85.11 | 427.00 | 91.83 |
| 426.07 | 88.18 | 426.07 | 84.04 | 426.07 | 85.14 | 426.07 | 91.87 |
| 425.00 | 88.21 | 425.00 | 84.00 | 425.00 | 85.00 | 425.00 | 91.86 |
| 424.07 | 88.24 | 424.07 | 84.05 | 424.07 | 85.08 | 424.07 | 91.97 |
| 423.00 | 88.16 | 423.00 | 83.95 | 423.00 | 85.03 | 423.00 | 91.89 |
| 422.07 | 88.15 | 422.07 | 83.93 | 422.07 | 84.99 | 422.07 | 91.87 |
| 420.99 | 88.18 | 420.99 | 83.91 | 420.99 | 85.00 | 420.99 | 91.91 |
| 420.07 | 88.16 | 420.07 | 83.85 | 420.07 | 84.96 | 420.07 | 91.88 |
| 418.99 | 88.15 | 418.99 | 83.80 | 418.99 | 84.92 | 418.99 | 91.88 |
| 418.07 | 88.12 | 418.07 | 83.79 | 418.07 | 84.91 | 418.07 | 91.88 |
| 416.99 | 88.14 | 416.99 | 83.78 | 416.99 | 84.90 | 416.99 | 91.90 |
| 416.06 | 88.10 | 416.06 | 83.73 | 416.06 | 84.88 | 416.06 | 91.86 |
| 414.99 | 88.09 | 414.99 | 83.69 | 414.99 | 84.84 | 414.99 | 91.87 |
| 414.06 | 88.07 | 414.06 | 83.66 | 414.06 | 84.85 | 414.06 | 91.89 |
| 412.98 | 88.07 | 412.98 | 83.64 | 412.98 | 84.82 | 412.98 | 91.90 |
| 412.06 | 88.07 | 412.06 | 83.61 | 412.06 | 84.81 | 412.06 | 91.89 |
| 410.98 | 88.06 | 410.98 | 83.59 | 410.98 | 84.75 | 410.98 | 91.90 |
| 410.05 | 88.07 | 410.05 | 83.56 | 410.05 | 84.73 | 410.05 | 91.90 |
| 408.97 | 88.06 | 408.97 | 83.52 | 408.97 | 84.73 | 408.97 | 91.92 |
| 408.05 | 88.04 | 408.05 | 83.51 | 408.05 | 84.73 | 408.05 | 91.92 |
| 406.96 | 88.05 | 406.96 | 83.47 | 406.96 | 84.70 | 406.96 | 91.91 |
| 406.04 | 87.99 | 406.04 | 83.41 | 406.04 | 84.66 | 406.04 | 91.90 |
| 404.96 | 88.00 | 404.96 | 83.41 | 404.96 | 84.59 | 404.96 | 91.90 |
| 404.03 | 88.01 | 404.03 | 83.40 | 404.03 | 84.59 | 404.03 | 91.93 |
| 402.95 | 87.98 | 402.95 | 83.34 | 402.95 | 84.56 | 402.95 | 91.92 |
| 402.02 | 87.97 | 402.02 | 83.31 | 402.02 | 84.54 | 402.02 | 91.90 |
| 400.94 | 87.96 | 400.94 | 83.26 | 400.94 | 84.52 | 400.94 | 91.92 |
| 400.01 | 87.95 | 400.01 | 83.24 | 400.01 | 84.51 | 400.01 | 91.89 |
| 398.93 | 87.90 | 398.93 | 83.16 | 398.93 | 84.43 | 398.93 | 91.89 |
| 398.01 | 87.87 | 398.01 | 83.14 | 398.01 | 84.38 | 398.01 | 91.87 |
| 396.92 | 87.88 | 396.92 | 83.08 | 396.92 | 84.39 | 396.92 | 91.85 |
| 396.00 | 87.86 | 396.00 | 83.04 | 396.00 | 84.41 | 396.00 | 91.86 |
| 395.07 | 87.85 | 395.07 | 83.07 | 395.07 | 84.31 | 395.07 | 91.84 |
| 393.99 | 87.78 | 393.99 | 82.93 | 393.99 | 84.28 | 393.99 | 91.83 |
| 393.06 | 87.77 | 393.06 | 82.90 | 393.06 | 84.25 | 393.06 | 91.81 |
| 391.97 | 87.76 | 391.97 | 82.88 | 391.97 | 84.15 | 391.97 | 91.79 |
| 391.05 | 87.74 | 391.05 | 82.82 | 391.05 | 84.14 | 391.05 | 91.78 |
| 389.96 | 87.70 | 389.96 | 82.75 | 389.96 | 84.12 | 389.96 | 91.74 |
| 389.03 | 87.64 | 389.03 | 82.68 | 389.03 | 84.06 | 389.03 | 91.73 |
| 387.95 | 87.61 | 387.95 | 82.64 | 387.95 | 83.99 | 387.95 | 91.69 |
| 387.02 | 87.57 | 387.02 | 82.57 | 387.02 | 83.93 | 387.02 | 91.65 |
| 385.94 | 87.52 | 385.94 | 82.49 | 385.94 | 83.86 | 385.94 | 91.64 |
| 385.01 | 87.49 | 385.01 | 82.43 | 385.01 | 83.82 | 385.01 | 91.58 |
| 383.92 | 87.46 | 383.92 | 82.41 | 383.92 | 83.74 | 383.92 | 91.57 |
| 382.99 | 87.40 | 382.99 | 82.31 | 382.99 | 83.72 | 382.99 | 91.53 |
| 382.06 | 87.37 | 382.06 | 82.24 | 382.06 | 83.64 | 382.06 | 91.48 |
| 380.98 | 87.31 | 380.98 | 82.21 | 380.98 | 83.59 | 380.98 | 91.50 |
| 380.05 | 87.32 | 380.05 | 82.15 | 380.05 | 83.60 | 380.05 | 91.47 |
| 378.96 | 87.34 | 378.96 | 82.09 | 378.96 | 83.61 | 378.96 | 91.52 |
| 378.03 | 87.34 | 378.03 | 82.17 | 378.03 | 83.53 | 378.03 | 91.52 |
| 376.95 | 87.35 | 376.95 | 82.13 | 376.95 | 83.52 | 376.95 | 91.54 |
| 376.02 | 87.33 | 376.02 | 82.11 | 376.02 | 83.52 | 376.02 | 91.58 |
| 374.93 | 87.34 | 374.93 | 82.10 | 374.93 | 83.53 | 374.93 | 91.57 |
| 374.00 | 87.35 | 374.00 | 82.06 | 374.00 | 83.52 | 374.00 | 91.61 |
| 373.07 | 87.35 | 373.07 | 82.02 | 373.07 | 83.51 | 373.07 | 91.62 |
| 371.98 | 87.34 | 371.98 | 81.98 | 371.98 | 83.48 | 371.98 | 91.64 |
| 371.05 | 87.31 | 371.05 | 81.98 | 371.05 | 83.42 | 371.05 | 91.62 |
| 369.97 | 87.29 | 369.97 | 81.91 | 369.97 | 83.42 | 369.97 | 91.60 |
| 369.03 | 87.28 | 369.03 | 81.85 | 369.03 | 83.39 | 369.03 | 91.60 |
| 367.95 | 87.24 | 367.95 | 81.80 | 367.95 | 83.31 | 367.95 | 91.60 |
| 367.01 | 87.22 | 367.01 | 81.76 | 367.01 | 83.27 | 367.01 | 91.59 |
| 365.93 | 87.17 | 365.93 | 81.67 | 365.93 | 83.23 | 365.93 | 91.56 |
| 365.00 | 87.14 | 365.00 | 81.64 | 365.00 | 83.20 | 365.00 | 91.50 |
| 364.06 | 87.07 | 364.06 | 81.52 | 364.06 | 83.18 | 364.06 | 91.50 |
| 362.98 | 87.07 | 362.98 | 81.47 | 362.98 | 83.07 | 362.98 | 91.47 |
| 362.04 | 87.04 | 362.04 | 81.48 | 362.04 | 83.00 | 362.04 | 91.51 |
| 360.95 | 86.96 | 360.95 | 81.37 | 360.95 | 82.86 | 360.95 | 91.38 |
| 360.02 | 86.92 | 360.02 | 81.27 | 360.02 | 82.83 | 360.02 | 91.35 |
| 358.93 | 86.84 | 358.93 | 81.17 | 358.93 | 82.84 | 358.93 | 91.30 |
| 358.00 | 86.78 | 358.00 | 81.12 | 358.00 | 82.61 | 358.00 | 91.21 |
| 357.07 | 86.69 | 357.07 | 81.00 | 357.07 | 82.56 | 357.07 | 91.16 |
| 355.98 | 86.64 | 355.98 | 80.91 | 355.98 | 82.46 | 355.98 | 91.11 |
| 355.05 | 86.58 | 355.05 | 80.83 | 355.05 | 82.41 | 355.05 | 91.06 |
| 353.96 | 86.48 | 353.96 | 80.72 | 353.96 | 82.25 | 353.96 | 90.95 |
| 353.02 | 86.42 | 353.02 | 80.60 | 353.02 | 82.19 | 353.02 | 90.87 |
| 351.93 | 86.26 | 351.93 | 80.40 | 351.93 | 82.02 | 351.93 | 90.72 |
| 351.00 | 86.16 | 351.00 | 80.29 | 351.00 | 81.90 | 351.00 | 90.67 |
| 350.06 | 86.09 | 350.06 | 80.19 | 350.06 | 81.81 | 350.06 | 90.51 |
| 348.97 | 85.95 | 348.97 | 80.00 | 348.97 | 81.65 | 348.97 | 90.42 |
| 348.04 | 85.78 | 348.04 | 79.81 | 348.04 | 81.43 | 348.04 | 90.22 |
| 346.95 | 85.65 | 346.95 | 79.63 | 346.95 | 81.27 | 346.95 | 90.11 |
| 346.02 | 85.49 | 346.02 | 79.48 | 346.02 | 81.09 | 346.02 | 89.94 |
| 344.93 | 85.33 | 344.93 | 79.26 | 344.93 | 80.86 | 344.93 | 89.75 |
| 343.99 | 85.17 | 343.99 | 79.09 | 343.99 | 80.71 | 343.99 | 89.59 |
| 343.06 | 84.91 | 343.06 | 78.83 | 343.06 | 80.48 | 343.06 | 89.34 |
| 341.96 | 84.67 | 341.96 | 78.51 | 341.96 | 80.17 | 341.96 | 89.07 |
| 341.03 | 84.44 | 341.03 | 78.28 | 341.03 | 79.91 | 341.03 | 88.90 |
| 339.94 | 84.26 | 339.94 | 78.00 | 339.94 | 79.70 | 339.94 | 88.60 |
| 339.00 | 83.94 | 339.00 | 77.69 | 339.00 | 79.35 | 339.00 | 88.29 |
| 338.07 | 83.66 | 338.07 | 77.36 | 338.07 | 79.01 | 338.07 | 87.97 |
| 336.97 | 83.34 | 336.97 | 77.00 | 336.97 | 78.64 | 336.97 | 87.58 |
| 336.04 | 82.97 | 336.04 | 76.60 | 336.04 | 78.24 | 336.04 | 87.21 |
| 334.95 | 82.58 | 334.95 | 76.16 | 334.95 | 77.84 | 334.95 | 86.79 |
| 334.01 | 82.25 | 334.01 | 75.78 | 334.01 | 77.45 | 334.01 | 86.39 |
| 333.07 | 81.78 | 333.07 | 75.28 | 333.07 | 76.92 | 333.07 | 85.85 |
| 331.98 | 81.26 | 331.98 | 74.72 | 331.98 | 76.33 | 331.98 | 85.28 |
| 331.05 | 80.77 | 331.05 | 74.22 | 331.05 | 75.85 | 331.05 | 84.76 |
| 329.95 | 80.27 | 329.95 | 73.65 | 329.95 | 75.27 | 329.95 | 84.18 |
| 329.02 | 79.71 | 329.02 | 73.06 | 329.02 | 74.69 | 329.02 | 83.55 |
| 327.92 | 78.95 | 327.92 | 72.24 | 327.92 | 73.89 | 327.92 | 82.67 |
| 326.99 | 78.33 | 326.99 | 71.55 | 326.99 | 73.12 | 326.99 | 81.96 |
| 326.05 | 77.61 | 326.05 | 70.81 | 326.05 | 72.42 | 326.05 | 81.19 |
| 324.96 | 76.87 | 324.96 | 70.04 | 324.96 | 71.61 | 324.96 | 80.26 |
| 324.02 | 76.12 | 324.02 | 69.31 | 324.02 | 70.77 | 324.02 | 79.53 |
| 322.92 | 75.04 | 322.92 | 68.12 | 322.92 | 69.66 | 322.92 | 78.24 |
| 321.99 | 74.07 | 321.99 | 67.04 | 321.99 | 68.59 | 321.99 | 77.12 |
| 321.05 | 73.07 | 321.05 | 66.08 | 321.05 | 67.63 | 321.05 | 75.99 |
| 319.96 | 72.06 | 319.96 | 65.00 | 319.96 | 66.50 | 319.96 | 74.89 |
| 319.02 | 71.04 | 319.02 | 63.94 | 319.02 | 65.43 | 319.02 | 73.66 |
| 317.92 | 69.52 | 317.92 | 62.40 | 317.92 | 63.91 | 317.92 | 72.00 |
| 316.98 | 68.18 | 316.98 | 61.02 | 316.98 | 62.50 | 316.98 | 70.43 |
| 316.05 | 66.96 | 316.05 | 59.80 | 316.05 | 61.20 | 316.05 | 68.99 |
| 314.95 | 65.64 | 314.95 | 58.52 | 314.95 | 59.80 | 314.95 | 67.64 |
| 314.01 | 64.31 | 314.01 | 56.97 | 314.01 | 58.38 | 314.01 | 66.04 |
| 313.07 | 62.53 | 313.07 | 55.28 | 313.07 | 56.65 | 313.07 | 64.15 |
| 311.98 | 60.77 | 311.98 | 53.44 | 311.98 | 54.81 | 311.98 | 62.05 |
| 311.04 | 59.24 | 311.04 | 51.90 | 311.04 | 53.13 | 311.04 | 60.32 |
| 309.94 | 57.43 | 309.94 | 50.10 | 309.94 | 51.38 | 309.94 | 58.31 |
| 309.01 | 55.74 | 309.01 | 48.46 | 309.01 | 49.68 | 309.01 | 56.44 |
| 308.07 | 53.62 | 308.07 | 46.45 | 308.07 | 47.49 | 308.07 | 54.14 |
| 306.97 | 51.41 | 306.97 | 44.24 | 306.97 | 45.27 | 306.97 | 51.57 |

TABLE 3-continued

| NT-82 | | NT-89 | | NT-90 | | Uncoated Slide | |
|---|---|---|---|---|---|---|---|
| WL (nm) | % T | WL (nm) | % T | WL (nm) | % T | WL (nm) | % T |
| 306.03 | 49.55 | 306.03 | 42.30 | 306.03 | 43.39 | 306.03 | 49.44 |
| 304.94 | 47.49 | 304.94 | 40.41 | 304.94 | 41.35 | 304.94 | 47.18 |
| 304.00 | 45.47 | 304.00 | 38.46 | 304.00 | 39.34 | 304.00 | 44.92 |
| 303.06 | 43.18 | 303.06 | 36.25 | 303.06 | 37.15 | 303.06 | 42.51 |
| 301.96 | 40.80 | 301.96 | 34.00 | 301.96 | 34.60 | 301.96 | 39.80 |
| 301.02 | 38.79 | 301.02 | 32.10 | 301.02 | 32.82 | 301.02 | 37.69 |
| 299.92 | 36.53 | 299.92 | 29.91 | 299.92 | 30.68 | 299.92 | 35.13 |
| 298.98 | 34.21 | 298.98 | 28.00 | 298.98 | 28.53 | 298.98 | 32.96 |
| 298.04 | 31.94 | 298.04 | 25.80 | 298.04 | 26.33 | 298.04 | 30.60 |
| 296.94 | 29.55 | 296.94 | 23.69 | 296.94 | 24.02 | 296.94 | 27.92 |
| 296.00 | 27.53 | 296.00 | 21.73 | 296.00 | 22.19 | 296.00 | 25.76 |
| 295.06 | 25.91 | 295.06 | 20.35 | 295.06 | 20.95 | 295.06 | 24.14 |
| 293.97 | 23.56 | 293.97 | 18.19 | 293.97 | 18.72 | 293.97 | 21.56 |
| 293.02 | 21.27 | 293.02 | 16.29 | 293.02 | 16.59 | 293.02 | 19.33 |
| 291.93 | 19.19 | 291.93 | 14.40 | 291.93 | 14.81 | 291.93 | 17.25 |
| 290.99 | 17.61 | 290.99 | 13.11 | 290.99 | 13.43 | 290.99 | 15.70 |
| 290.04 | 16.15 | 290.04 | 11.90 | 290.04 | 12.06 | 290.04 | 14.24 |
| 288.95 | 14.16 | 288.95 | 10.31 | 288.95 | 10.58 | 288.95 | 12.36 |
| 288.01 | 12.52 | 288.01 | 8.89 | 288.01 | 9.09 | 288.01 | 10.71 |
| 287.06 | 11.09 | 287.06 | 7.78 | 287.06 | 7.95 | 287.06 | 9.37 |
| 285.97 | 9.76 | 285.97 | 6.71 | 285.97 | 6.87 | 285.97 | 8.16 |
| 285.02 | 8.75 | 285.02 | 6.01 | 285.02 | 6.17 | 285.02 | 7.30 |
| 283.92 | 7.43 | 283.92 | 4.96 | 283.92 | 5.07 | 283.92 | 6.05 |
| 282.98 | 6.42 | 282.98 | 4.23 | 282.98 | 4.31 | 282.98 | 5.15 |
| 282.04 | 5.48 | 282.04 | 3.53 | 282.04 | 3.61 | 282.04 | 4.34 |
| 280.94 | 4.67 | 280.94 | 2.95 | 280.94 | 3.01 | 280.94 | 3.60 |
| 280.00 | 4.14 | 280.00 | 2.56 | 280.00 | 2.60 | 280.00 | 3.14 |
| 279.06 | 3.44 | 279.06 | 2.09 | 279.06 | 2.13 | 279.06 | 2.58 |
| 277.96 | 2.83 | 277.96 | 1.67 | 277.96 | 1.71 | 277.96 | 2.06 |
| 277.01 | 2.37 | 277.01 | 1.38 | 277.01 | 1.41 | 277.01 | 1.72 |
| 276.07 | 2.07 | 276.07 | 1.18 | 276.07 | 1.21 | 276.07 | 1.48 |
| 274.97 | 1.71 | 274.97 | 0.94 | 274.97 | 0.96 | 274.97 | 1.18 |
| 274.03 | 1.40 | 274.03 | 0.76 | 274.03 | 0.77 | 274.03 | 0.94 |
| 272.93 | 1.10 | 272.93 | 0.58 | 272.93 | 0.59 | 272.93 | 0.72 |
| 271.99 | 0.93 | 271.99 | 0.47 | 271.99 | 0.49 | 271.99 | 0.60 |
| 271.04 | 0.79 | 271.04 | 0.39 | 271.04 | 0.40 | 271.04 | 0.50 |
| 269.94 | 0.63 | 269.94 | 0.30 | 269.94 | 0.31 | 269.94 | 0.39 |
| 269.00 | 0.50 | 269.00 | 0.24 | 269.00 | 0.24 | 269.00 | 0.31 |
| 268.06 | 0.40 | 268.06 | 0.18 | 268.06 | 0.18 | 268.06 | 0.23 |
| 266.95 | 0.32 | 266.95 | 0.14 | 266.95 | 0.14 | 266.95 | 0.19 |
| 266.01 | 0.26 | 266.01 | 0.11 | 266.01 | 0.11 | 266.01 | 0.14 |
| 265.07 | 0.22 | 265.07 | 0.09 | 265.07 | 0.09 | 265.07 | 0.12 |
| 263.97 | 0.17 | 263.97 | 0.07 | 263.97 | 0.07 | 263.97 | 0.09 |
| 263.02 | 0.13 | 263.02 | 0.05 | 263.02 | 0.05 | 263.02 | 0.07 |
| 262.08 | 0.10 | 262.08 | 0.04 | 262.08 | 0.03 | 262.08 | 0.05 |
| 260.98 | 0.08 | 260.98 | 0.03 | 260.98 | 0.03 | 260.98 | 0.04 |
| 260.03 | 0.07 | 260.03 | 0.03 | 260.03 | 0.02 | 260.03 | 0.04 |
| 258.93 | 0.06 | 258.93 | 0.02 | 258.93 | 0.02 | 258.93 | 0.03 |
| 257.99 | 0.04 | 257.99 | 0.01 | 257.99 | 0.01 | 257.99 | 0.02 |
| 257.04 | 0.04 | 257.04 | 0.01 | 257.04 | 0.01 | 257.04 | 0.02 |
| 255.94 | 0.02 | 255.94 | 0.01 | 255.94 | 0.00 | 255.94 | 0.01 |
| 254.99 | 0.03 | 254.99 | 0.01 | 254.99 | 0.00 | 254.99 | 0.02 |
| 254.05 | 0.01 | 254.05 | 0.01 | 254.05 | 0.01 | 254.05 | 0.00 |
| 252.95 | 0.02 | 252.95 | 0.01 | 252.95 | 0.00 | 252.95 | 0.01 |
| 252.00 | 0.01 | 252.00 | 0.01 | 252.00 | 0.00 | 252.00 | 0.01 |
| 251.06 | 0.01 | 251.06 | 0.01 | 251.06 | 0.00 | 251.06 | 0.01 |
| 249.96 | 0.01 | 249.96 | 0.00 | 249.96 | 0.00 | 249.96 | 0.00 |
| 249.02 | 0.00 | 249.02 | 0.00 | 249.02 | 0.00 | 249.02 | 0.00 |
| 248.08 | 0.01 | 248.08 | 0.00 | 248.08 | 0.00 | 248.08 | 0.00 |
| 246.98 | 0.00 | 246.98 | 0.00 | 246.98 | 0.00 | 246.98 | 0.00 |
| 246.04 | 0.01 | 246.04 | 0.01 | 246.04 | 0.00 | 246.04 | 0.01 |
| 244.94 | 0.02 | 244.94 | 0.02 | 244.94 | 0.01 | 244.94 | 0.02 |
| 244.00 | 0.02 | 244.00 | 0.01 | 244.00 | 0.01 | 244.00 | 0.01 |
| 243.06 | 0.02 | 243.06 | 0.01 | 243.06 | 0.02 | 243.06 | 0.02 |
| 241.97 | 0.02 | 241.97 | 0.02 | 241.97 | 0.01 | 241.97 | 0.02 |
| 241.03 | 0.03 | 241.03 | 0.03 | 241.03 | 0.03 | 241.03 | 0.04 |
| 239.93 | 0.04 | 239.93 | 0.04 | 239.93 | 0.03 | 239.93 | 0.05 |
| 238.99 | 0.04 | 238.99 | 0.04 | 238.99 | 0.04 | 238.99 | 0.04 |
| 238.05 | 0.04 | 238.05 | 0.03 | 238.05 | 0.03 | 238.05 | 0.03 |
| 236.95 | 0.03 | 236.95 | 0.02 | 236.95 | 0.02 | 236.95 | 0.02 |
| 236.01 | 0.04 | 236.01 | 0.03 | 236.01 | 0.03 | 236.01 | 0.03 |
| 235.07 | 0.02 | 235.07 | 0.02 | 235.07 | 0.02 | 235.07 | 0.02 |
| 233.97 | 0.02 | 233.97 | 0.02 | 233.97 | 0.02 | 233.97 | 0.02 |
| 233.03 | 0.01 | 233.03 | 0.01 | 233.03 | 0.01 | 233.03 | 0.01 |
| 231.93 | 0.01 | 231.93 | 0.01 | 231.93 | 0.00 | 231.93 | 0.01 |
| 230.99 | 0.01 | 230.99 | 0.01 | 230.99 | 0.00 | 230.99 | 0.01 |
| 230.05 | 0.01 | 230.05 | 0.01 | 230.05 | 0.01 | 230.05 | 0.01 |
| 228.95 | 0.03 | 228.95 | 0.03 | 228.95 | 0.02 | 228.95 | 0.00 |
| 228.01 | 0.01 | 228.01 | 0.01 | 228.01 | 0.03 | 228.01 | 0.02 |
| 227.07 | 0.01 | 227.07 | 0.00 | 227.07 | 0.00 | 227.07 | 0.01 |
| 225.97 | 0.01 | 225.97 | 0.01 | 225.97 | 0.01 | 225.97 | 0.01 |
| 225.03 | 0.01 | 225.03 | 0.01 | 225.03 | 0.00 | 225.03 | 0.01 |
| 223.93 | 0.02 | 223.93 | 0.01 | 223.93 | 0.01 | 223.93 | 0.01 |
| 222.99 | 0.01 | 222.99 | 0.01 | 222.99 | 0.00 | 222.99 | 0.01 |
| 222.04 | 0.02 | 222.04 | 0.01 | 222.04 | 0.01 | 222.04 | 0.01 |
| 220.95 | 0.01 | 220.95 | 0.01 | 220.95 | 0.01 | 220.95 | 0.01 |
| 220.00 | 0.01 | 220.00 | 0.01 | 220.00 | 0.00 | 220.00 | 0.00 |
| 219.06 | 0.02 | 219.06 | 0.02 | 219.06 | 0.01 | 219.06 | 0.02 |
| 217.96 | 0.02 | 217.96 | 0.02 | 217.96 | 0.01 | 217.96 | 0.01 |
| 217.02 | 0.01 | 217.02 | 0.01 | 217.02 | 0.01 | 217.02 | 0.01 |
| 216.08 | 0.02 | 216.08 | 0.02 | 216.08 | 0.02 | 216.08 | 0.02 |
| 214.98 | 0.02 | 214.98 | 0.02 | 214.98 | 0.01 | 214.98 | 0.02 |
| 214.03 | 0.02 | 214.03 | 0.01 | 214.03 | 0.02 | 214.03 | 0.02 |
| 212.93 | 0.02 | 212.93 | 0.02 | 212.93 | 0.02 | 212.93 | 0.02 |
| 211.99 | 0.02 | 211.99 | 0.01 | 211.99 | 0.01 | 211.99 | 0.01 |
| 211.05 | 0.02 | 211.05 | 0.02 | 211.05 | 0.01 | 211.05 | 0.02 |
| 209.95 | 0.01 | 209.95 | 0.01 | 209.95 | 0.01 | 209.95 | 0.01 |
| 209.01 | 0.02 | 209.01 | 0.02 | 209.01 | 0.02 | 209.01 | 0.01 |
| 208.06 | 0.02 | 208.06 | 0.02 | 208.06 | 0.01 | 208.06 | 0.02 |
| 206.96 | 0.01 | 206.96 | 0.02 | 206.96 | 0.01 | 206.96 | 0.01 |
| 206.02 | 0.02 | 206.02 | 0.01 | 206.02 | 0.01 | 206.02 | 0.02 |
| 205.08 | 0.02 | 205.08 | 0.01 | 205.08 | 0.01 | 205.08 | 0.02 |
| 203.98 | 0.02 | 203.98 | 0.02 | 203.98 | 0.02 | 203.98 | 0.02 |
| 203.03 | 0.02 | 203.03 | 0.02 | 203.03 | 0.02 | 203.03 | 0.02 |
| 201.93 | 0.03 | 201.93 | 0.02 | 201.93 | 0.02 | 201.93 | 0.02 |

The solution that was developed will eventually be used as a final coating to lower the surface energy of nano-textured glass materials. The combination of nano-texturing and fatty-acid based solutions should result in a less expensive superhydrophobic surface with no loss of durability or optical transparency.

Example 2

An optically transparent, hydrophobic coating with an average contact angle of 109.7 degrees was successfully developed using low-cost, environmentally friendly materials and chemical procedures. Since simply dissolving the fatty acid and coating it on a slide did not yield the desired result, a two-part epoxy resin and a cyanoacrylate (specifically, KRAZY GLUE®)) were incorporated into different solutions in order to improve the ability to bind the fatty acid to the glass surface. Results showed that ethyl cyanoacrylate proved to be the better choice, and dramatically increased the hydrophobicity and clarity of the coating. The achieved contact angle was almost identical to the target contact angle of RAIN-X®, (110°). Since inexpensive and eco-friendly components were used, this new coating can potentially replace other hydrophobic coatings as an alternate for a fraction of the cost.

These examples demonstrate a hydrophobic surface using only inexpensive, biocompatible reagents and simple application techniques. This technology does not involve any detrimental byproducts. Clear paths toward optimization exist in the testing of the individual components in different ratios (fatty acid to binding to solvent ratios). Optimizing the choice of solvent to avoid the toxicity of toluene will be a key step toward commercialization. While we demonstrated the technology via spin coating, we propose that this method will be easily adaptable to spray on applications that are far more consumer friendly.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A coating composition comprising:
   a solvent, in an amount of from 98.5 to 99.3 percent by weight based on the total weight of the coating composition;
   a straight-chain fatty acid, in an amount of from 0.1 to 1 percent by weight based on the total weight of the coating composition;
   wherein said composition comprises at least one epoxy resin and at least one cyanoacrylate, in an amount of from 0.1 to 0.9 percent by weight based on the total weight of the coating composition; and
   wherein when applied to a substrate the coating composition provides a surface exhibiting a contact angle of at least 100 degrees with a drop of water, and
   wherein when applied to the substrate the coating is optically transparent.

2. The coating according to claim 1, wherein the surface exhibits a contact angle with a drop of water of at least 150 degrees with a drop of water.

3. The coating according to claim 1, wherein the solvent is selected from the group consisting of ethanol, isopropanol, hexane, acetone, toluene and combinations thereof.

4. The coating according to claim 1, wherein the cyanoacrylate is a cyanoacrylate according to Formula I,

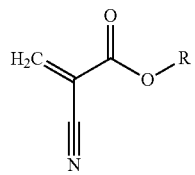

I wherein R is a $C_1$-$C_{100}$ hydrocarbon.

5. The coating according to claim 1, wherein the cyanoacrylate is selected from the group consisting of n-propyl-cyanoacrylate, iso-propyl cyanoacrylate, n-butylcyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphthyl-cyanoacrylate, 2-(2'-methoxy)-ethoxy ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butylcyanoacrylate, 2-(2'-ethoxy)-butyloxy butyl-cyanoacrylate, 2-(2'-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-propyloxy propyl-cyanoacrylate, 2-(3'-methoxy)-butyloxy propyl-cyanoacrylate, 2-(2'-methoxy)-ethoxy propyl-cyanoacrylate, and 2-(2'-methoxy)-ethoxy, butyl-cyanoacrylate, and combinations thereof.

6. The coating according to claim 1, wherein the fatty acid is a fatty acid according to Formula II

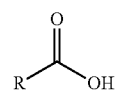

II wherein R is a $C_{12}$-$C_{100}$ hydrocarbon.

7. The coating according to claim 1, wherein the fatty acid is selected from the group consisting of Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid, Arachidic acid, Heneicosylic acid, Behenic acid, Tricosylic acid, Lignoceric acid, Pentacosylic acid, Cerotic acid, Heptacosylic acid, Montanic acid, Nonacosylic acid, Melissic acid, Henatriacontylic acid, Lacceroic acid, Psyllic acid, Geddic acid, Ceroplastic acid, Hexatriacontylic acid, and combinations thereof.

8. The coating according to claim 1, wherein the epoxy resin is selected from the group consisting of a bisphenol A epoxy resin, a bisphenol F epoxy resin, a novolac epoxy resin, an aliphatic epoxy resin, a glycidylamine epoxy resin, and combinations thereof.

9. A method for providing a surface with a contact angle of at least 100 degrees with respect to a drop of water, the method comprising applying a composition to the surface, the composition comprising
a solvent, in an amount of from 98.5 to 99.3 percent by weight based on the total weight of the coating composition;
a straight-chain, unsubstituted fatty acid, in an amount of from 0.1 to 1 percent by weight based on the total weight of the coating composition;
wherein said composition comprises at least one epoxy resin and at least one cyanoacrylate, in an amount of from 0.1 to 0.9 percent by weight based on the total weight of the coating composition; and
wherein when applied to the surface the composition is optically transparent.

10. The method according to claim 9 wherein the coating composition is applied by one selected from the group consisting of spin coating, spraying, and combinations thereof.

11. The method according to claim 9, wherein the solvent is selected from the group consisting of ethanol, isopropanol, hexane, acetone, toluene and combinations thereof.

12. The method according to claim 9, wherein the cyanoacrylate is a cyanoacrylate according to Formula I,

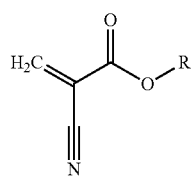

wherein R is a $C_1$-$C_{100}$ hydrocarbon.

13. The method according to claim 9, wherein the cyanoacrylate is selected from the group consisting of n-propyl-cyanoacrylate, iso-propyl cyanoacrylate, n-butylcyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphthyl-cyanoacrylate, 2-(2'-methoxy)-ethoxy ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2'-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butylcyanoacrylate, 2-(2'-ethoxy)-butyloxy butyl-cyanoacrylate, 2-(2-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-propyloxy propyl-cyanoacrylate, 2-(3'-methoxy)-butyloxy propyl-cyanoacrylate, 2-(2'-methoxy)-ethoxy propyl-cyanoacrylate, and 2-(2'-methoxy)-ethoxy, butyl-cyanoacrylate, and combinations thereof.

14. The method according to claim 9, wherein the fatty acid is a fatty acid according to Formula II

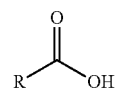

wherein R is a $C_{12}$-$C_{100}$ hydrocarbon.

15. The method according to claim 9, wherein the fatty acid is selected from the group consisting of Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid, Arachidic acid, Heneicosylic acid, Behenic acid, Tricosylic acid, Lignoceric acid, Pentacosylic acid, Cerotic acid, Heptacosylic acid, Montanic acid, Nonacosylic acid, Melissic acid, Henatriacontylic acid, Lacceroic acid, Psyllic acid, Geddic acid, Ceroplastic acid, Hexatriacontylic acid, and combinations thereof.

16. The method according to claim 9, wherein the epoxy resin is selected from the group consisting of a bisphenol A epoxy resin, a bisphenol F epoxy resin, a novolac epoxy resin, an aliphatic epoxy resin, a glycidylamine epoxy resin, and combinations thereof.

17. A method for preparing a coating composition, the method comprising mixing a solvent, a straight-chain, unsubstituted fatty acid, wherein said composition comprises at least one epoxy resin and at least one cyanoacrylate, to form the coating composition, wherein the solvent is present in an amount of from 98.5 to 99.3 percent by weight based on the total weight of the coating composition, wherein the fatty acid is present in an amount of from 0.1 to 1 percent by weight based on the total weight of the coating composition, wherein the epoxy resin and the cyanoacrylate is present in an amount of from 0.1 to 0.9 percent by weight based on the total weight of the coating composition, and wherein when applied to a substrate, the coating composition provides a surface exhibiting a contact angle of at least 100 degrees with a drop of water, wherein when applied to the substrate the coating composition is optically transparent.

18. The method according to claim 17, wherein the coating composition is applied by one selected from the group consisting of spin coating, spraying, and combinations thereof.

19. The method according to claim 17, wherein the solvent is selected from the group consisting of ethanol, isopropanol, hexane, acetone, toluene and combinations thereof.

20. The method according to claim 17, wherein the cyanoacrylate is a cyanoacrylate according to Formula I,

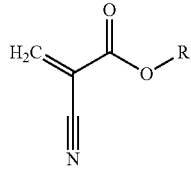

I wherein R is a $C_1$-$C_{100}$ hydrocarbon.

21. The method according to claim 17, wherein the cyanoacrylate is selected from the group consisting of n-propyl-cyanoacrylate, iso-propyl cyanoacrylate, n-butyl-cyanoacrylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, 2-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoacrylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphthyl-cyanoacrylate, 2-(2'-methoxy)-ethoxy ethyl-cyanoacrylate, 2-(2'-ethoxy)-ethoxy ethyl-cyanoacrylate, 2-(2-propyloxy)-ethoxy ethyl-cyanoacrylate, 2-(2-butyloxy)-ethoxy ethyl-cyanoacrylate, 2-(2-pentyloxy)-ethoxy ethyl-cyanoacrylate, 2-(2'-hexyloxy)-ethoxy ethyl-cyanoacrylate, 2-(2'-methoxy)-propyloxy propyl-cyanoacrylate, 2-(2-ethoxy)-propyloxy propyl-cyanoacrylate, 2-(2'-propyloxy)-propyloxy propyl-cyanoacrylate, 2-(2-pentyloxy)-propyloxy propyl-cyanoacrylate, 2-(2-hexyloxy)-propyloxy propyl-cyanoacrylate, 2-(2-methoxy)-butyloxy butylcyanoacrylate, 2-(2-ethoxy)-butyloxy butyl-cyanoacrylate, 2-(2-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-propyloxy propyl-cyanoacrylate, 2-(3'-methoxy)-butyloxy propyl-cyanoacrylate, 2-(2'-methoxy)-ethoxy propyl-cyanoacrylate, and 2-(2-methoxy)-ethoxy, butyl-cyanoacrylate, and combinations thereof.

22. The method according to claim 17, wherein the fatty acid is a fatty acid according to Formula II

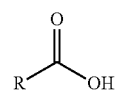

II wherein R is a $C_{12}$-$C_{100}$ hydrocarbon.

23. The method according to claim 17, wherein the fatty acid is selected from the group consisting of Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid, Arachidic acid, Heneicosylic acid, Behenic acid, Tricosylic acid, Lignoceric acid, Pentacosylic acid, Cerotic acid, Heptacosylic acid, Montanic acid, Nonacosylic acid, Melissic acid, Henatriacontylic acid, Lacceroic acid, Psyllic acid, Geddic acid, Ceroplastic acid, Hexatriacontylic acid, and combinations thereof.

24. The method according to claim 17, wherein the epoxy resin is selected from the group consisting of a bisphenol A epoxy resin, a bisphenol F epoxy resin, a novolac epoxy resin, an aliphatic epoxy resin, a glycidylamine epoxy resin, and combinations thereof.

* * * * *